US011192413B2

United States Patent
Brenner et al.

(10) Patent No.: US 11,192,413 B2
(45) Date of Patent: Dec. 7, 2021

(54) WHEEL SUSPENSION FOR AN AT LEAST SLIGHTLY ACTIVELY STEERABLE REAR WHEEL OF A TWO-TRACK VEHICLE, AXLE COMPRISING A WHEEL SUSPENSION, AND VEHICLE COMPRISING A WHEEL SUSPENSION

(71) Applicant: Bayerische Motoren Werke Aktiengesellschaft, Munich (DE)

(72) Inventors: Markus Brenner, Munich (DE); Alfred Stenzenberger, Fuenfstetten (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 132 days.

(21) Appl. No.: 16/682,242

(22) Filed: Nov. 13, 2019

(65) Prior Publication Data

US 2020/0079167 A1  Mar. 12, 2020

Related U.S. Application Data

(63) Continuation of application No. PCT/EP2018/061550, filed on May 4, 2018.

(30) Foreign Application Priority Data

May 19, 2017 (DE) ...................... 10 2017 208 554.1

(51) Int. Cl.
*B60G 3/20* (2006.01)
*B60G 7/00* (2006.01)
*B62D 7/14* (2006.01)

(52) U.S. Cl.
CPC .............. *B60G 3/20* (2013.01); *B60G 7/008* (2013.01); *B62D 7/146* (2013.01);
(Continued)

(58) Field of Classification Search
CPC ...... B60G 3/20; B60G 7/008; B60G 2200/18; B60G 2200/44; B60G 2200/462;
(Continued)

(56) References Cited

U.S. PATENT DOCUMENTS 4,726,603 A * 2/1988 Sugiyama .............. B60G 7/006
280/5.522
4,752,079 A * 6/1988 Fahrner ..................... B60B 9/26
152/208

(Continued)

FOREIGN PATENT DOCUMENTS

DE 39 28 135 A1 3/1990
DE 103 30 894 A1 2/2005
(Continued)

OTHER PUBLICATIONS

German-language Search Report issued in German Application No. 10 2017 208 554.1 dated Aug. 14, 2020 with partial English translation (15 pages).
(Continued)

*Primary Examiner* — Paul N Dickson
*Assistant Examiner* — Timothy Wilhelm
(74) *Attorney, Agent, or Firm* — Crowell & Moring LLP

(57) ABSTRACT

A wheel suspension for an at least slightly actively steerable has a wheel carrier for receiving a wheel, a toe link, and at least one further link for connecting the wheel carrier to the vehicle body, and an actuator arrangement having at least one actuator for actively steering the wheel in a first active steering direction and in a second active steering direction. The wheel carrier is formed in at least two parts and has a first wheel carrier part and a second wheel carrier part. The first wheel carrier part is designed to receive the wheel and the second wheel carrier part can be attached via at least one of the further links to the vehicle body, in a non-actively (Continued)

steerable manner. The first wheel carrier part and the second wheel carrier part in a functional state of use of the wheel suspension in a vehicle are movable relative to one another by the actuator arrangement, such that an active, at least slight steering movement of the wheel can be effected.

16 Claims, 8 Drawing Sheets

(52) U.S. Cl.
CPC ...... *B60G 2200/18* (2013.01); *B60G 2200/44* (2013.01); *B60G 2200/462* (2013.01); *B60G 2204/148* (2013.01); *B60G 2204/422* (2013.01); *B60G 2206/50* (2013.01)

(58) Field of Classification Search
CPC ........ B60G 2204/148; B60G 2204/422; B60G 2206/50; B60G 2200/17; B60G 2200/156; B62D 7/146; B62D 7/06; B62D 7/18; B60B 27/0036
See application file for complete search history.

(56) References Cited

U.S. PATENT DOCUMENTS

| | | | | |
|---|---|---|---|---|
| 4,973,070 A * | 11/1990 | Menichini | | B60G 3/205 280/5.521 |
| 5,087,229 A * | 2/1992 | Hewko | | B60K 7/0007 180/65.51 |
| 5,150,763 A * | 9/1992 | Yamashita | | B60K 7/0007 180/242 |
| 5,156,414 A * | 10/1992 | Fayard | | G01B 5/24 280/86.75 |
| 5,161,813 A * | 11/1992 | Yamashita | | B60G 3/00 180/253 |
| 5,700,025 A * | 12/1997 | Lee | | B60G 3/265 280/124.135 |
| 5,938,219 A * | 8/1999 | Hayami | | B60G 7/008 280/124.135 |
| 6,347,802 B1 * | 2/2002 | Mackle | | B60G 3/265 280/5.52 |
| 6,386,553 B2 * | 5/2002 | Zetterstrom | | B60G 3/20 180/413 |
| 6,776,425 B2 * | 8/2004 | Britton | | B62D 13/06 280/103 |
| 6,974,138 B2 * | 12/2005 | Perello | | B60G 3/01 180/402 |
| 7,222,863 B2 * | 5/2007 | Deal | | B60G 3/01 280/124.135 |
| 7,537,071 B2 * | 5/2009 | Kamiya | | B60G 3/20 180/298 |
| 7,537,223 B2 * | 5/2009 | Zetterstroem | | B60G 3/265 280/5.52 |
| 7,703,565 B2 * | 4/2010 | Ikenoya | | B60K 17/356 180/65.51 |
| 7,766,345 B2 * | 8/2010 | Hakui | | B60G 7/006 280/5.521 |
| 7,862,057 B2 * | 1/2011 | Hilmann | | B60G 13/006 280/93.511 |
| 7,958,959 B2 * | 6/2011 | Yogo | | B60K 7/0007 180/65.51 |
| 7,988,158 B2 * | 8/2011 | Liu | | B60G 3/26 280/5.521 |
| 7,997,596 B2 * | 8/2011 | Yuta | | B62D 17/00 280/86.758 |
| 8,050,819 B2 * | 11/2011 | Suyama | | B60W 40/10 701/37 |
| 8,152,185 B2 * | 4/2012 | Siebeneick | | B60G 7/008 280/124.134 |
| 8,162,332 B2 * | 4/2012 | Michel | | B62D 17/00 280/86.751 |
| 8,215,653 B2 * | 7/2012 | Siebeneick | | B60G 7/008 280/93.512 |
| 8,322,729 B2 * | 12/2012 | Michel | | B62D 17/00 280/5.52 |
| 8,424,880 B2 * | 4/2013 | Horiguchi | | B60G 7/008 280/5.521 |
| 8,463,506 B2 * | 6/2013 | Yanagi | | B62D 5/046 701/49 |
| 8,500,133 B2 * | 8/2013 | Michel | | B60G 7/006 280/5.52 |
| 8,690,177 B2 * | 4/2014 | Buchwitz | | G06F 16/245 280/124.135 |
| 8,714,574 B2 * | 5/2014 | Glanzer | | B60G 3/202 280/124.136 |
| 8,894,077 B2 * | 11/2014 | Michel | | B60G 7/006 280/86.754 |
| 8,910,952 B2 * | 12/2014 | Yoo | | B60G 7/006 280/5.522 |
| 8,943,916 B2 * | 2/2015 | Osterlaenger | | B60G 7/006 74/89.39 |
| 9,187,126 B2 * | 11/2015 | Kawauchi | | B62D 7/146 |
| 9,333,824 B2 * | 5/2016 | Zandbergen | | B62D 17/00 |
| 9,359,007 B2 * | 6/2016 | Lee | | B62D 7/163 |
| 9,446,642 B2 * | 9/2016 | Stenzenberger | | B60G 11/14 |
| 9,643,643 B2 * | 5/2017 | Fujita | | B62D 7/146 |
| 9,821,835 B2 * | 11/2017 | Ferrer-Dalmau Nieto | | B62D 5/0418 |
| 10,112,649 B2 * | 10/2018 | Rogers | | B60G 15/068 |
| 10,160,486 B2 * | 12/2018 | Kim | | B62D 7/14 |
| 10,351,173 B2 * | 7/2019 | Schmid | | B62D 17/00 |
| 10,668,950 B2 * | 6/2020 | Kurita | | F16C 19/50 |
| 10,806,106 B2 * | 10/2020 | Olson | | A01G 25/09 |
| 10,988,177 B2 * | 4/2021 | Rogers | | B62D 17/00 |
| 2002/0036385 A1 * | 3/2002 | Mackie | | B60G 3/265 280/5.521 |
| 2005/0017472 A1 * | 1/2005 | Kondo | | B62D 7/18 280/93.513 |
| 2005/0280241 A1 * | 12/2005 | Bordini | | B62D 9/00 280/124.135 |
| 2006/0033301 A1 * | 2/2006 | Roos | | B60G 7/02 280/124.125 |
| 2008/0129005 A1 | 6/2008 | Hilmann et al. | | |
| 2009/0261550 A1 | 10/2009 | Siebeneick | | |
| 2010/0013176 A1 | 1/2010 | Aramah et al. | | |
| 2010/0276904 A1 * | 11/2010 | Pavuk | | B60G 3/202 280/124.135 |
| 2011/0193302 A1 * | 8/2011 | Horiguchi | | B60G 21/007 280/5.521 |
| 2015/0217618 A1 * | 8/2015 | Dorrestijn | | B62D 7/146 280/5.52 |
| 2016/0144891 A1 | 5/2016 | Reubens et al. | | |
| 2017/0210435 A1 * | 7/2017 | Lykken | | A01B 76/00 |

FOREIGN PATENT DOCUMENTS

| | | |
|---|---|---|
| DE | 10 2006 016 762 A1 | 10/2007 |
| DE | 10 2006 056 484 A1 | 6/2008 |
| DE | 10 2006 059 778 B3 | 7/2008 |
| DE | 10 2009 033 105 A1 | 1/2011 |
| DE | 10 2011 007 283 A1 | 10/2012 |
| DE | 10 2012 015 333 A1 | 2/2014 |
| DE | 102012015333 A1 * 2/2014 ............ B62D 7/18 | |
| EP | 1 927 528 A2 | 6/2008 |
| WO | WO 2015/000892 A1 | 1/2015 |

OTHER PUBLICATIONS

International Search Report (PCT/ISA/210) issued in PCT Application No. PCT/EP2018/061550 dated Jul. 17, 2018 with English translation (six (6) pages).
German-language Written Opinion (PCT/ISA/237) issued in PCT Application No. PCT/EP2018/061550 dated Jul. 17, 2018 (16 pages).

(56) References Cited

OTHER PUBLICATIONS

Cover page of EP 3 016 832 A1 published May 11, 2016 (one (1) page).

* cited by examiner

WHEEL SUSPENSION FOR AN AT LEAST SLIGHTLY ACTIVELY STEERABLE REAR WHEEL OF A TWO-TRACK VEHICLE, AXLE COMPRISING A WHEEL SUSPENSION, AND VEHICLE COMPRISING A WHEEL SUSPENSION

CROSS REFERENCE TO RELATED APPLICATIONS

This application is a continuation of PCT International Application No. PCT/EP2018/061550, filed May 4, 2018, which claims priority under 35 U.S.C. § 119 from German Patent Application No. 10 2017 208 554.1, filed May 19, 2017, the entire disclosures of which are herein expressly incorporated by reference.

BACKGROUND AND SUMMARY OF THE INVENTION

The present invention relates to a wheel suspension for an at least slightly actively steerable rear wheel of a two-track vehicle, and to an axle for a two-track vehicle, in particular for a two-track motor vehicle, and to a vehicle having a wheel suspension of said type.

Wheel suspensions for an at least slightly actively steerable rear wheel are well known from the prior art, for example from the "Renault Laguna GT", for which a rear-wheel steering system was offered as optional equipment under the name "4Control all-wheel steering", or from the "BMW 7 Series" and the "BMW 5 Series", for which the rear-wheel steering system was offered in conjunction with the active steering system as optional equipment under the name "Integral Active Steering".

In the case of both steering systems, that is to say both in the case of the "4Control all-wheel steering" from "Renault" and in the case of the "Integral Active Steering" from "BMW", it is possible, during steering-induced turning of the front wheels, for the wheels of the rear axle to simultaneously be actively steered up to a wheel turn angle of at most 3.5° or 3°, wherein, below a defined speed value, the rear wheels are turned in the respectively opposite direction in relation to the front wheels, in order to permit as small as possible a turning circle, whereas, above a defined speed, the rear wheels are turned in the same direction as the front wheels, in order to improve the driving stability of the vehicle at relatively high speed.

In the case of the rear-wheel steering system from BMW, the "Integral Active Steering", the steering movement of the rear wheels is in this case effected by way of an actuator device which is arranged in the region of the rear axle and which is coupled, in each case by a track rod, to the left-hand rear wheel and to the right-hand rear wheel and by which the active steering movement of the rear wheels can be effected in each case. A wheel suspension for the above-stated purpose is known for example from DE 10 2011 007 283 A1.

Here, however, for structural space reasons, the maximum possible wheel turn angle is generally limited to a few degrees, and in particular, in most cases, only wheel turn angles of at most 3.5° are possible, in exceptional cases of at most 5°, because the required structural space is not available for greater wheel turn angles.

Also known from the prior art, for example from DE 103 30 894 A1, are wheel suspensions for active camber adjustment, in the case of which the camber angle of a vehicle wheel can be actively varied by means of an actuator. The wheel suspension described in DE 103 30 894 A1 has a split wheel carrier, of which a first part is coupled to a frame or to a body of the vehicle by means of links and a second part is mounted pivotably on the first part. Also provided is an actuator, by means of which the two wheel carrier parts are pivotable relative to one another, wherein, by means of a pivoting of the two wheel carrier parts relative to one another, the camber of the vehicle wheel fastened to the wheel carrier can be varied. Additionally, the wheel carrier may be divided further, and may in particular have three wheel carrier parts, which are connected to one another by means of two actuators, wherein the first wheel carrier part is connected to the second wheel carrier part pivotably about a substantially horizontally running pivot axis, and the second wheel carrier part is connected to the third wheel carrier part pivotably about a substantially vertically running pivot axis. By means of the pivotable connection between the second wheel carrier part and the third wheel carrier part with a substantially vertically running pivot axis, it is possible for active steering, in particular active toe steering, of the vehicle wheel connected to the wheel carrier to be effected by means of an actuator that acts between the second and third wheel carrier parts.

Against this background of the prior art, it is an object of the present invention to provide an alternative wheel suspension, in particular an improved wheel suspension, which permits at least slightly active steering of a rear wheel of a two-track vehicle. Here, it is preferably an object of the invention to provide a wheel suspension for an at least slightly actively steerable rear wheel of a two-track vehicle, with which greater wheel turn angles are possible in the case of a similar available structural space. It is furthermore an object of the present invention to provide an actively steerable rear axle for a two-track vehicle, and a two-track vehicle having an actively steerable rear axle.

This and other objects are achieved by a wheel suspension, by an axle, and by a vehicle, in accordance with the claimed invention. Some of the features mentioned below will, in order to avoid repetitions, be described only once, that is to say only in conjunction with a wheel suspension according to the invention, with an axle according to the invention or with a vehicle according to the invention, but apply, independently of this, to a wheel suspension according to the invention, to an axle according to the invention and to a vehicle according to the invention.

A wheel suspension according to the invention for an at least slightly actively steerable rear wheel of a two-track vehicle has a wheel carrier for holding the wheel, a toe link, and at least one further link for connecting the wheel carrier to the vehicle body, and an actuator device with at least one actuator for actively steering the wheel in a first active steering direction, preferably in a toe-in direction, and in a second active steering direction, in particular in a toe-out direction, wherein the wheel carrier is formed in at least two parts and has a first wheel carrier part and a second wheel carrier part. The first wheel carrier part is designed for holding the wheel and the second wheel carrier part is connectable by at least one of the further links to the vehicle body, in particular not in an actively steerable manner, wherein, in a functional state of use of the wheel suspension in a vehicle, the first wheel carrier part and the second wheel carrier part are movable relative to one another by the actuator device such that an active, at least slight steering movement of the wheel can be effected.

According to a first aspect of the invention, the toe link is articulated at the wheel carrier side on the first wheel carrier part and at least one actuator of the actuator device is coupled by way of the toe link to the first wheel carrier part, wherein, in particular, at least one actuator of the actuator device is connected by the toe link to the first wheel carrier part.

By contrast, according to a second aspect of the invention, the toe link is articulated at the wheel carrier side on the second wheel carrier part and at least one actuator of the actuator device couples the first wheel carrier part to the second wheel carrier part.

With a wheel suspension according to the invention, both with a wheel suspension designed according to the first aspect of the invention and with a wheel suspension designed according to the second aspect of the invention, it is possible, in relation to a similar wheel suspension with a single-part wheel carrier, to achieve in each case an increase of the maximum possible wheel turn angle during active steering of more than 2°, in particular an increase of up to 7° depending on axle geometry and kinematics, with an approximately equal structural space requirement of the wheel carrier and an otherwise approximately unchanged axle geometry, in particular without structural space conflicts between the wheel or the tire thereof and a rear axle carrier and/or the body shell, in particular the longitudinal members thereof. That is to say, with a wheel suspension according to the invention, it is possible to realize wheel turn angles of more than 5°, in particular of up to 10°, in particular toe-in, in particular with a similar structural space requirement. As a result, a considerable reduction of the turning circle is possible.

In the context of the invention, "actively steerable" is to be understood to mean the effecting of a steering movement by way of an actuator device, that is to say a wheel which is actively steerable within the meaning of the invention is a wheel which can be steered by way of an actuator device.

In the context of the invention, "steering" is to be understood to mean the effecting of a toe angle change of a wheel.

In the context of the invention, "at least slightly actively steerable" is to be understood to mean the effecting of a steering movement, in particular a toe angle change, with a wheel turn angle of less than 15°, in particular of less than 10°.

In the context of the invention, a toe link is to be understood to mean that link of the wheel suspension by which the toe angle of the wheel is adjustable.

In the context of the invention, "coupled" means "interacting with one another, in particular mechanically", wherein two components that are coupled to one another are, in the context of the invention, mechanically connected to one another for this purpose, wherein the two components may in this case be connected to one another in each case directly without additional components in between, or else indirectly with at least one further component in between.

Preferably, the at least one further link of a wheel suspension according to the invention, particularly preferably all of the further links, are connected, in particular articulated, at the wheel carrier side to the second wheel carrier part, wherein preferably, the at least one link of the wheel suspension is connected, as in the conventional manner known from the prior art, to the wheel carrier, in particular all of the further links.

Preferably, the second wheel carrier part of a wheel suspension according to the invention is not designed to be actively steerable, in particular is not connected to the vehicle body in an actively steerable manner, but only the first wheel carrier part is. The second wheel carrier part preferably connected to the vehicle body such that, as in the case of a conventional axle, said second wheel carrier part permits a lifting movement of the wheel and/or elastokinematic steering movements of the wheel, wherein the second wheel carrier part is in particular not actively pivotable relative to the vehicle body, but rather is merely movable relative to the vehicle body such that the abovementioned lifting movement and/or the abovementioned elastokinematic steering movements can be effected in particular only by means of external transverse, longitudinal and/or vertical forces acting on the wheel.

At least one actuator of the actuator device is preferably a linear actuator, in particular a linear motor, wherein the actuator is preferably an electrically drivable actuator. Alternatively, at least one actuator of the actuator device may also be a hydraulic actuator, in particular a hydraulic cylinder.

The toe link of a wheel suspension according to the invention designed according to the first aspect of the invention is preferably connected at the vehicle body side to the actuator, wherein, in this case, the actuator is particularly preferably connected to the vehicle body, that is to say to the body shell and/or to an axle support, in particular to the rear axle support. It is particularly preferable in this case for at least one actuator and/or the entire actuator device to be designed as a linear actuator, in particular as a so-called "central actuator" and/or as a "central actuator device", by means of which both the left-hand rear wheel of an actively steerable rear axle of a two-track vehicle is actively steerable and also the right-hand rear wheel of the axle, preferably simultaneously, in particular in the same direction.

Here, in the context of the invention, steering in the same direction means steering both wheels of an axle simultaneously in the same direction, that is to say steering simultaneously to the left or simultaneously to the right.

In the case of a wheel suspension according to the invention designed according to the second aspect of the invention, the toe link is, by contrast, articulated at the vehicle body side preferably directly on the vehicle body, that is to say on the body shell of the vehicle or on an axle support, in particular on the rear axle support. In this case, the active steering movement, that is to say in particular the relative movement of the first wheel carrier part with respect to the second wheel carrier part, is effected by means of the at least one actuator by means of which the first wheel carrier part and the second wheel carrier part are coupled to one another.

In an advantageous embodiment of a wheel suspension according to the invention designed according to the second aspect of the invention, at least one actuator of the actuator device is connected to the first wheel carrier part and the second wheel carrier part and is in particular at least partially arranged between the first wheel carrier part and the second wheel carrier part in a vehicle transverse direction. In this way, the relative movement between the first wheel carrier part and the second wheel carrier part that is required for active steering can be effected, in particular generated, in a particularly simple manner, in particular by means of one linear actuator.

In an advantageous embodiment of a wheel suspension according to the invention, both in the case of a wheel suspension designed according to the first aspect of the invention and in the case of a wheel suspension designed according to the second aspect of the invention, the first wheel carrier part and the second wheel carrier part are connected to one another pivotably about a pivot axis running substantially in a vehicle vertical direction, which pivot axis defines an active steering axis at least in a first defined active steering angle range and/or for the first active steering direction.

Preferably, for this purpose, the first wheel carrier part and the second wheel carrier part are connected to one another by means of a hinge joint, wherein the hinge joint preferably has a pin by means of which the first wheel carrier part and the second wheel carrier part are connected to one another and which in particular defines the pivot axis.

Here, in the context of the invention, a first defined active steering angle range is to be understood to mean a second wheel turn angle range which is passed through as a result of an active steering movement in a first active steering direction proceeding from the straight-ahead position, wherein, here, the respective wheel likewise rotates about an active steering axis or pivots about an active steering axis.

Here, in the context of the invention, a second defined active steering angle range is to be understood to mean a first wheel turn angle range which is passed through as a result of an active steering movement in a second active steering direction proceeding from the straight-ahead position, wherein, here, the respective wheel likewise rotates about an active steering axis or pivots about an active steering axis.

In the context of the invention, an active steering axis is to be understood to mean a steering axis about which a pivoting movement of the wheel, and thus a steering movement with a toe angle change, occurs during active steering.

The active steering axis of the first active steering direction and the active steering axis of the second active steering direction may coincide, though need not be identical.

The first defined active steering angle range is preferably passed through during steering toe-in proceeding from a straight-ahead position. The second defined steering angle range is preferably passed through during steering toe-out proceeding from the straight-ahead position.

A wheel suspension according to the invention is preferably basically designed such that the first wheel carrier part and the second wheel carrier part are pivotable jointly about a second steering axis, in particular without being moved relative to one another, wherein the second steering axis is preferably defined by the geometry and elastokinematics of the wheel suspension.

Here, in some embodiments of a wheel suspension according to the invention, the entire wheel carrier can be pivoted about said second steering axis actively, that is to say steered about the second steering axis actively.

By contrast, in other embodiments of a wheel suspension according to the invention, the entire wheel carrier can be pivoted about the second steering axis only passively, that is to say only owing to external forces and the axle kinematics and/or elastokinematic s.

Some embodiments of a wheel suspension according to the invention have multiple active steering axes, in particular a first active steering axis for steering in the first active steering direction and a second active steering axis for steering in the second active steering direction.

In some embodiments of a wheel suspension according to the invention, at least one active steering axis may coincide with another active steering axis and/or with the second steering axis about which the two wheel carrier parts can be pivoted jointly without being moved relative to one another. In other embodiments of a wheel suspension according to the invention, the second steering axis differs in each case from at least one active steering axis or from all active steering axes.

In a further advantageous embodiment of a wheel suspension according to the invention, both in the case of a wheel suspension designed according to the first aspect and in the case of a wheel suspension designed according to the second aspect of the invention, the pivot axis about which the first wheel carrier part and the second wheel carrier part are designed to be pivotable relative to one another is situated in front of wheel center in a vehicle longitudinal direction. In this way, a particularly advantageous embodiment of a wheel suspension according to the invention can be achieved, and in particular, the toe link can be arranged in each case behind wheel center, which is particularly advantageous from a structural space aspect.

Accordingly, in a further advantageous embodiment of a wheel suspension according to the invention, both in the case of an embodiment wheel suspension according to the first aspect invention and in the case of a wheel suspension designed according to the second aspect of the invention, the toe link is articulated on the wheel carrier behind wheel center in a vehicle longitudinal direction. This is advantageous in particular for structural space reasons. Thus, the toe link is then articulated on the first wheel carrier part behind wheel center in the case of a wheel suspension according to the first aspect of the invention, and on the second wheel carrier part behind wheel center in the case of a wheel suspension according to the second aspect of the invention.

Aside from the arrangement of the toe link behind wheel center in a vehicle longitudinal direction, the arrangement of the pivot axis in front of wheel center in the vehicle longitudinal direction in the case of a wheel suspension according to the invention designed according to the first aspect of the invention furthermore has the advantage that at least one actuator of the actuator device, in particular the entire actuator device, can likewise be arranged behind wheel center in the vehicle longitudinal direction, in particular in the region of the vehicle center, whereby the use of a central actuator device, in particular of a central actuator, by means of which both the left-hand rear wheel and the right-hand rear wheel of a rear axle of a two-track vehicle can be actively steered, preferably simultaneously and in particular in the same direction, is made possible in a particularly simple manner. This has the advantage that only one actuator has to be activated and monitored with regard to faults etc., whereby an integration into the overall vehicle is considerably simplified in relation to two individual actuators, that is to say in relation to an embodiment with one actuator for the left-hand vehicle wheel and one actuator for the right-hand vehicle wheel.

In a further advantageous embodiment of a wheel suspension according to the invention, wherein said embodiment is advantageous in particular in conjunction with a wheel suspension designed according to the first aspect of the invention, at least one wheel carrier part has a guide device for guiding the other wheel carrier part, preferably a guide device for guiding a free end of the other wheel carrier part, in particular for guiding the free end, averted from the pivot axis, of the other wheel carrier part. The stability of the wheel guidance can be considerably improved in this way.

It is preferable here for the second wheel carrier part to have a guide device for guiding the first wheel carrier part. Such a guide device may for example be a guide rail or a guide groove or one or more guide pins or the like.

The guide device is particularly preferably a groove which is open on one side and which in particular permits guidance of the first wheel carrier part at least in a toe-out situation, in particular around a straight-ahead position, preferably up to at least 1.5° toe-out, in particular up to 3° toe-out.

In a toe-in situation, that is to say during steering toe-in, guidance of the first wheel carrier part is not imperatively necessary, and the advantages achievable by means of the guidance can possibly be realized only by way of structural space disadvantages, such that, in some cases, it may be more advantageous if the guide device is designed so as to only permit guidance in a toe-out situation, or to permit guidance in a toe-out situation and only in a small active steering angle range around the straight-ahead position in a toe-in situation, preferably up to only 1° or 1.5° or at most 3° toe-in.

In a further advantageous embodiment of a wheel suspension according to the invention designed according to the first aspect of the invention, the wheel carrier has at least one stop, in particular a mechanical stop, in order to limit an active steering movement about the first active steering axis in at least one active steering direction, preferably at least in the second steering direction, in particular in a toe-out direction. In this way, in particular in conjunction with a central actuator device arranged in the vehicle center, it can be achieved that, after the stop has been reached, the wheel suspension exhibits steering kinematics similar to a similar wheel suspension with a wheel carrier formed as a single part. This has the advantage that, in this way, once the stop has been reached, the conventional kinematic and elastokinematic target values can be set in a particularly simple manner, and that, in particular, further steering in the second active steering direction can, by means of the cardanic characteristics of the bearings, be effected with corresponding kinematics and elastokinematics as are already conventional in the case of rear-axle steering systems known from the prior art.

It is self-evidently also possible for at least one stop, in particular a mechanical stop, to be provided in the first active steering direction, which stop limits an active steering movement in the first active steering direction, in particular in a toe-in direction, in order to thereby effect, after the stop has been reached during steering in a toe-in direction, characteristics of the wheel suspension similar to a single-part wheel carrier. From a structural space aspect, however, this is not advantageous in all cases. Here, this is dependent in particular on the respective characteristics of the wheel suspension, in particular the geometry and kinematics thereof, and whether this is expedient.

In a further advantageous embodiment of a wheel suspension according to the invention designed according to the first aspect of the invention, the wheel suspension is in particular designed such that, after the stop has been reached, preferably outside the first, defined active steering angle range, the first wheel carrier part and the second wheel carrier part are movable jointly about the second steering axis during further steering, preferably during further steering in the second active steering direction, in particular during further toe-out steering, that is to say during further steering in a toe-out direction, in particular during further, active steering by means of the actuator device, wherein the second steering axis is in particular defined by the geometry and elastokinematics of the wheel suspension.

In a further advantageous embodiment of a wheel suspension according to the invention designed according to the second aspect of the invention, the actuator device has at least two actuators, wherein, preferably, the first wheel carrier part and the second wheel carrier part are coupled to one another by means of two actuators of the actuator device.

In a particularly advantageous embodiment of a wheel suspension according to the invention according to the second aspect of the invention, the first wheel carrier part and the second wheel carrier part are in this case, for active steering, movable in each case oppositely in a vehicle transverse direction by means of the two actuators, wherein a relative movement of the two wheel carrier parts with respect to one another effects a steering movement of the wheel about an active steering axis, wherein the active steering axis is preferably situated in front of wheel center in the vehicle longitudinal direction in the case of active steering in a first active steering direction and in particular is situated behind wheel center in the case of active steering in a second active steering direction. Alternatively, the active steering axis may be situated between the two actuators, in particular centrally in between, preferably at the level of the wheel center. Such a wheel suspension allows the two wheels, that is to say the right-hand wheel and the left-hand wheel, of a rear axle to be steered independently of one another in a particularly simple manner. Furthermore, no structural space is required in the center of the vehicle for a central actuator device. However, two actuators are required for each wheel, which actuators must be correspondingly integrated into the overall vehicle and each require corresponding integration effort.

In a further advantageous embodiment of a wheel suspension according to the invention, both in the case of a wheel suspension designed according to the first aspect of the invention and in the case of a wheel suspension designed according to the second aspect invention, the first wheel carrier part and the second wheel carrier part are mechanically connected to one another by means of at least one coupling device.

In a particularly advantageous embodiment of a wheel suspension according to the invention, which may be designed both according to the first aspect of the invention and according to the second aspect of the invention, the first wheel carrier part and the second wheel carrier part are mechanically connected to one another by means of two coupling devices which are configured to guide the first wheel carrier part and the second wheel carrier part preferably in each case oppositely in a vehicle transverse direction during active steering, wherein a relative movement of the two wheel carrier parts with respect to one another effects a steering movement of the wheel about an active steering axis, wherein the active steering axis lies in particular between the two coupling devices in a vehicle longitudinal direction, preferably centrally between said coupling devices, in particular at the level of the wheel center.

In a further advantageous embodiment of a wheel suspension according to the invention, both in the case of a wheel suspension designed according to the first aspect of the invention and in the case of a wheel suspension designed according to the second aspect of the invention, at least one coupling device has a slotted link and/or an actuator or is formed by a slotted link and/or an actuator, wherein, preferably, both coupling devices have a slotted link and/or an actuator or are formed by a slotted link and/or an actuator.

It is particularly preferable here if the second wheel carrier part has at least one slotted link, preferably at least one slotted-link guide groove, whereas in particular the first wheel carrier part has at least one slotted-link block, in particular at least one slotted-link guide bolt, which is preferably guided in the slotted link, in particular in the slotted-link guide groove, of the second wheel carrier part. In this way, particularly advantageous mechanical coupling of the first wheel carrier part to the second wheel carrier part can be realized.

In particular with two actuators arranged between the first wheel carrier part and the second wheel carrier part, in particular if the actuators are designed as linear actuators, it is possible in a simple manner to provide a wheel suspension with flexibly adjustable active steering axis, because the respective active steering axis adjusts in a manner dependent on the relative movement of the two actuators.

An axle according to the invention for a two-track vehicle, in particular for a two-track motor vehicle, having a left-hand wheel suspension and a right-hand wheel suspension is distinguished by the fact that it has at least one wheel suspension according to the invention, wherein, preferably, the left-hand wheel suspension and the right-hand wheel suspension have the same features, that is to say identical construction, merely adapted in each case to the respective vehicle side.

In an advantageous embodiment of an axle according to the invention, the axle has a left-hand wheel suspension for a left-hand wheel and a right-hand wheel suspension for a right-hand wheel, wherein the left-hand wheel suspension and the right-hand wheel suspension are each designed according to the first aspect invention and have a common actuator device, in particular a common actuator, wherein, in a functional installed state of the axle in a vehicle, the first wheel carrier part and the second wheel carrier part of the left-hand wheel suspension are movable relative to one another by means of the common actuator device such that an active, at least slight steering movement of the left-hand wheel can be effected, and wherein, preferably at the same time, in a functional installed state of the axle in a vehicle, the first wheel carrier part and the second wheel carrier part of the right-hand wheel suspension are movable relative to one another by means of the common actuator device such that an active, at least slight steering movement of the right-hand wheel of the axle, in particular in the same direction, can be effected. That is to say, in other words, that an axle according to the invention preferably has a central actuator device by means of which both the left-hand rear wheel and the right-hand wheel of the axle are each actively steerable, preferably simultaneously, in particular in the same direction, that is to say simultaneously to the left and/or simultaneously to the right.

A vehicle according to the invention is distinguished by the fact that it has at least one wheel suspension according to the invention and/or at least one axle according to the invention.

These and further features emerge not only from the claims and from the description but also from the drawings, wherein the individual features may be realized in each case individually or severally in the form of sub-combinations in an embodiment of the invention and constitute advantageous and independently protectable designs, for which protection is claimed here where technically meaningful.

Other objects, advantages and novel features of the present invention will become apparent from the following detailed description of one or more preferred embodiments when considered in conjunction with the accompanying drawings.

Here, all of the described features and all of the illustrated features may be essential to the invention. For the sake of improved understanding, functionally identical components of the individual exemplary embodiments are denoted by the same reference designations.

DETAILED DESCRIPTION OF THE DRAWINGS

Figure 1:
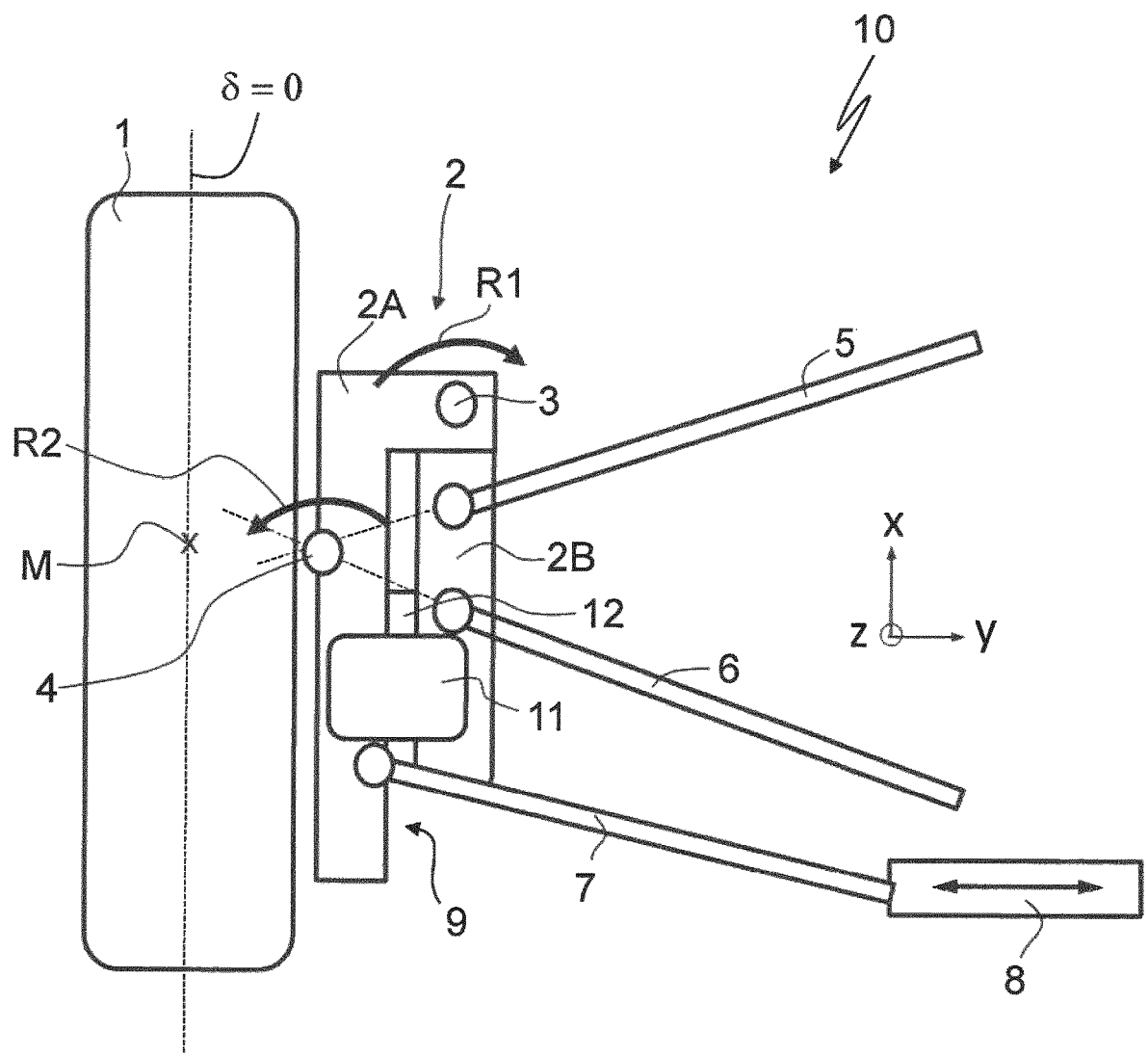
FIG. 1 shows a first exemplary embodiment of a wheel suspension according to the invention designed according to the first aspect of the invention for a left-hand rear wheel of an axle of a vehicle in a straight-ahead position in plan view.

FIG. 1 shows a first exemplary embodiment of a wheel suspension 10 according to the invention designed according to the first aspect of the invention for a left-hand rear wheel 1 of an axle (not illustrated here) of a two-track passenger motor vehicle (likewise not illustrated here) in a straight-ahead position in plan view, that is to say in the case of a toe angle of 6=0°, wherein the wheel suspension is designed to at least slightly actively steer the rear wheel 1.

In the present case, the straight-ahead position is designated in each case with a toe angle of $\delta=0°$, but encompasses all practically conventional axle settings with toe angles $\delta$ deviating from 0° in the design position. That is to say, in the context of the invention, the "straight-ahead position" is to be understood in each case to mean the wheel turn angle that is assumed in the design position when the steering wheel is straight, that is to say in the presence of a setpoint steering wheel angle of 0°, even if the toe angles $\delta$ assumed here at the wheel deviate from 0°.

The wheel suspension 10 according to the invention has a wheel carrier 2 for holding the wheel 1 and has multiple links 5, 6 and 7 for connecting the wheel carrier 2 to the vehicle body, in particular a toe link 7 and two further links 5 and 6, which in this case each serve as transverse links 5 and 6.

The wheel carrier 2 is of two-part form and has a first wheel carrier part 2A with a substantially L-shaped cross section in vehicle vertical direction z and a second wheel carrier part 2B with a substantially rectangular cross section in z direction, wherein the rear wheel 1 is fastened to the first wheel carrier part 2A and the second wheel carrier part 2B can be connected at least by means of the further links 5 and 6, that is to say at least by means of the two transverse links 5 and 6, to the vehicle body, not in an actively steerable manner. Here, the two further links 5 and 6 are provided in particular for connection, in the manner known and conventional from the prior art, to a rear-axle support (not illustrated here).

Furthermore, the wheel suspension 10 has an actuator device with an electrically drivable linear motor as actuator 8 for actively steering the wheel 1 in a first active steering direction R1 and in a second active steering direction R2, wherein steering-induced turning of the wheel 1 in the first active steering direction R1 causes steering of the wheel in a toe-in direction, and leads to toe angles δ+, and steering-induced turning of the wheel 1 in the second active steering direction R2 causes steering in a toe-out direction, that is to say leads to toe angles δ−. The actuator 8 is likewise designed for fastening to the rear-axle support (not illustrated here).

The first wheel carrier part 2A and the second wheel carrier part 2B are, by way of a bolt which is not designated in any more detail and which is in each case movably mounted in the two wheel carrier parts 2A and 2B, in particular by a bolt which is mounted in sliding fashion, connected to one another pivotably about a pivot axis 3 running substantially in vehicle vertical direction z, wherein, in this exemplary embodiment of a wheel suspension 10, the bolt, in particular the pivot axis 3, defines a first active steering axis 3 at least in a first defined active steering angle range, in particular for steering in the first active steering direction R1 proceeding from the straight-ahead position, that is to say proceeding from a toe angle of δ=0° in the direction of toe-in δ+.

Figure 2A:
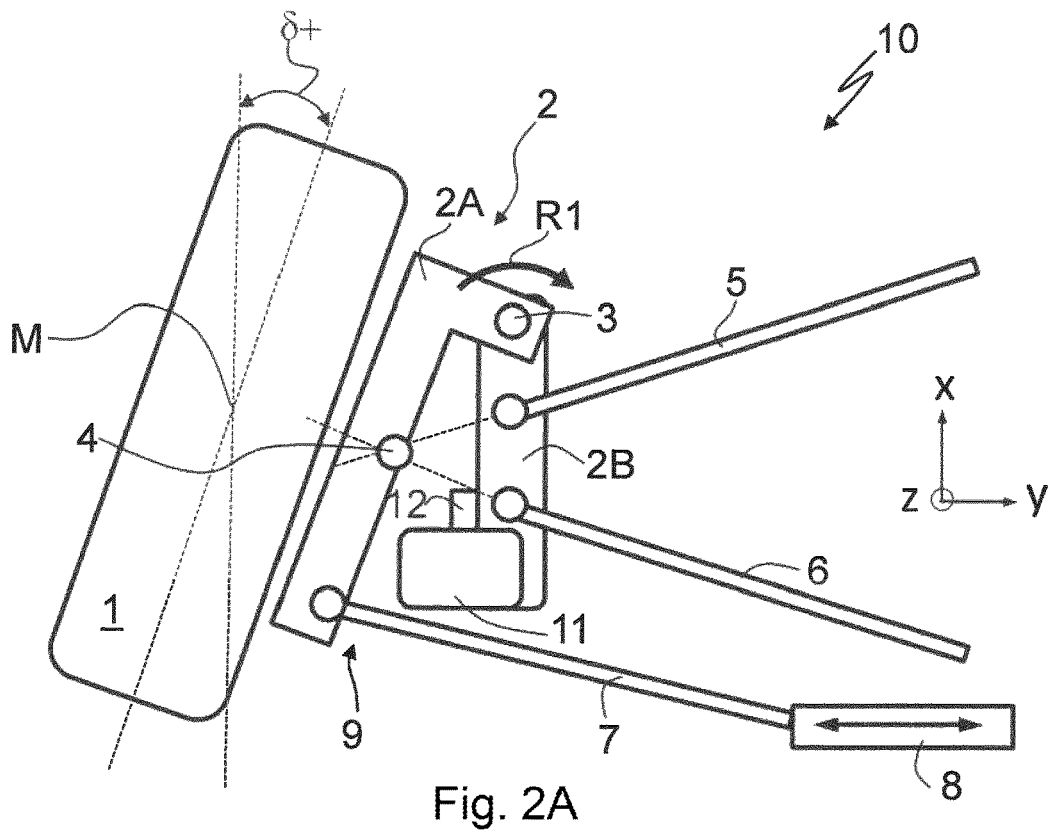
FIG. 2A shows, in plan view, the exemplary embodiment from FIG. 1 with the wheel actively steered in a toe-in direction.
Figure 2B:
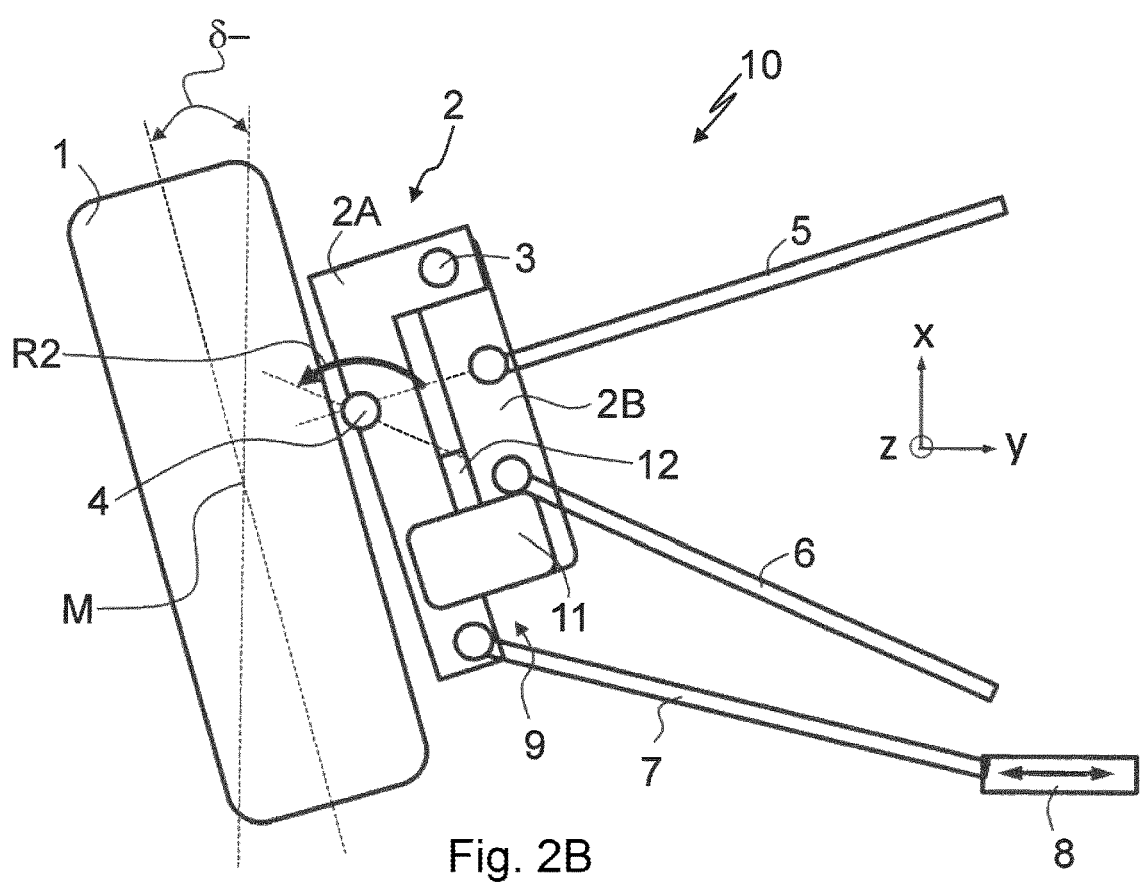
FIG. 2B shows, in plan view, the exemplary embodiment from FIGS. 1 and 2A with the wheel actively steered in a toe-out direction.

This can be clearly seen on the basis of FIGS. 2A and 2B, wherein FIG. 2A shows, in plan view, the exemplary embodiment from FIG. 1 with the wheel 1 actively steered in a toe-in direction δ+, and FIG. 2B shows, in plan view, the exemplary embodiment from FIG. 1 with the wheel 1 actively steered in a toe-out direction δ−.

In the case of this wheel suspension 10, the pivot axis 3, which in this case coincides with the first active steering axis 3, is situated in front of wheel center M in vehicle longitudinal direction x.

In the case of this wheel suspension 10 designed according to the first aspect of the invention, to transmit the steering force generated by the actuator device, in particular by the linear motor 8, to the wheel carrier 2, in particular to the first wheel carrier part 2A, the toe link 7 is, according to the invention, articulated at the wheel carrier side on the first wheel carrier part 2A and connected at the vehicle body side to the actuator 8, wherein, in this case, the toe link 7 is, in order to provide the greatest possible lever for active steering, articulated on the wheel carrier 2 behind wheel center M in vehicle longitudinal direction x, in particular on a free end 9 of the first wheel carrier part 2A. The connection of the toe link behind wheel center M in vehicle longitudinal direction x is furthermore advantageous for structural space reasons, because there is generally more structural space available behind wheel center M than in front of wheel center M.

The connection of the toe link 7 to the wheel carrier 2 is realized here by way of a joint which is known from and commonly used in the prior art for the connection of the toe link at the wheel carrier side to the wheel carrier.

For a particularly stable wheel suspension 10, this exemplary embodiment of a wheel suspension 10 according to the invention has a guide device 11 which is fastened to the second wheel carrier part 2B and which is designed to at least partially guide the first wheel carrier part 2A, in particular the free end 9 thereof, which is situated on the wheel carrier part 2A on the side averted from the pivot axis 3, at least partially during active steering. In this way, particularly stable wheel guidance can be achieved in particular in the range around the straight-ahead position, that is to say around δ=0°, (see FIG. 1) and during active and/or passive steering in a toe angle range proceeding from the straight-ahead position δ=0° in the toe-out direction δ−, which is particularly important because toe angles δ around the straight-ahead position arise in particular at very high speeds, at which very high forces act on the wheel suspension.

Furthermore, the wheel suspension 10 according to the invention illustrated in FIGS. 1 to 2B has a stop 12 which is formed by a stop element 12 in the form of a rubber buffer and which serves as a mechanical stop and which is provided for limiting an active steering movement about the first active steering axis 3 in the second active steering direction R2, that is to say during active steering in the toe-out direction δ−, as can be clearly seen from FIGS. 2A and 2B.

In a functional state of use of the wheel suspension 10 in a vehicle, in particular in a two-track vehicle, the first wheel carrier part 2A and the second wheel carrier part 2B are movable relative to one another by way of the actuator device, in particular by the linear motor 8, such that an active steering movement of the wheel 1 of at least 7° about the first steering axis 3, in particular of up to 10° about the first active steering axis 3, in the first active steering direction R1 is possible, wherein, here, the wheel carrier 2 "pivots open" substantially about the pivot axis 3 and the first wheel carrier part 2A rotates about the pivot axis 3 relative to the second wheel carrier part 2B, which, in a functional state of use of the wheel suspension 10, is fastened to the vehicle body not in an actively steerable manner, see FIGS. 2A and 2B.

Here, an actuator movement in vehicle transverse direction y toward the outside of the vehicle, that is to say in the direction of the wheel 1 in relation to the illustration in FIGS. 1 to 2B, causes the wheel carrier 2 to "pivot open" as illustrated by way of example in FIG. 2A, and thus causes steering of the left-hand rear wheel 1 in the toe-in direction δ+, in particular in the first active steering direction R1, whereas an actuator movement in vehicle transverse direction y to the right, that is to say toward the inside of the vehicle, causes a "pivoting-closed" movement and causes steering in the second active steering direction R2 of the rear wheel 1 and thus effects a turning of the wheel in the direction of toe-out δ−, as illustrated by way of example in FIG. 2B.

If no relative movement of the two wheel carrier parts 2A and 2B with respect to one another occurs, the steering movement of the wheel 1 occurs about a second steering axis 4, as in the case of a conventional wheel suspension known from the prior art with a wheel carrier formed as a single part, wherein the kinematics and elastokinematics of the wheel suspension and/or of the axle define the profile of the second steering axis 4.

The wheel suspension 10 according to the invention designed according to the first aspect of the invention as illustrated in FIGS. 1 to 2B is in this case in particular designed such that, after the stop 12 has been reached, wherein, in the case of the wheel suspension 10, the stop 12 is reached when a defined toe-out angle δ− is overshot, the first wheel carrier part 2A and the second wheel carrier part 2B are pivotable jointly, that is to say in the manner of a single-part wheel carrier, about the second steering axis 4 during further active steering in the second active steering direction R2, that is to say during further steering in the direction of toe-out δ−, as far as an end position of the actuator 8, wherein the second steering axis 4 is in particular defined by the geometry and elastokinematics of the wheel suspension 10 and, in this case, defines a second active steering axis. In this way, after the stop 12 has been reached or when the first wheel carrier part 2A bears against the stop 12, the wheel suspension 10 behaves in the manner of a conventional wheel suspension with single-part wheel carrier during further steering in the toe-out direction δ−, both in the case of further active steering by means of the actuator device and in the case of further passive steering owing to externally acting forces in the direction of toe-out δ−.

That is to say, the steering movement about the second steering axis 4, without a relative movement of the two wheel carrier parts 2A and 2B with respect to one another, may in this case be an actively caused steering movement, that is to say a steering movement effected by means of the actuator device 8, or else a passive steering movement, caused by external forces and the axle kinematics and/or elastokinematics, and brought about for example by steering effects during spring compression or spring extension movements, wherein, in the case of this wheel suspension 10, the second steering axis 4 defines a second active steering axis 4 during active steering only during further steering in the toe-out direction δ− after the stop 12 has been reached.

With the wheel suspension 10 according to the invention, during active steering, in particular during active steering in the toe-in direction δ+, the steering axis that is effective during active steering, in this case the first active steering axis 3, can be relocated further forward in vehicle longitudinal direction x and further inward in the vehicle transverse direction in relation to the conventional second steering axis 4 that constitutes the steering axis during passive steering and/or during active steering when the first wheel carrier part 2A and the second wheel carrier part 2B are not moved relative to one another, resulting in different structural space conditions during the turning of the wheel. With corresponding structural design of a wheel suspension 10 according to the invention, it is thus possible for the available structural space to be better utilized for the benefit of greater wheel turn angles. In particular, it is possible to realize greater wheel turn angles or toe angles, in particular during steering in the toe-in direction δ+. In this way, in turn, a considerable reduction of the turning circle can be achieved.

Figure 3:
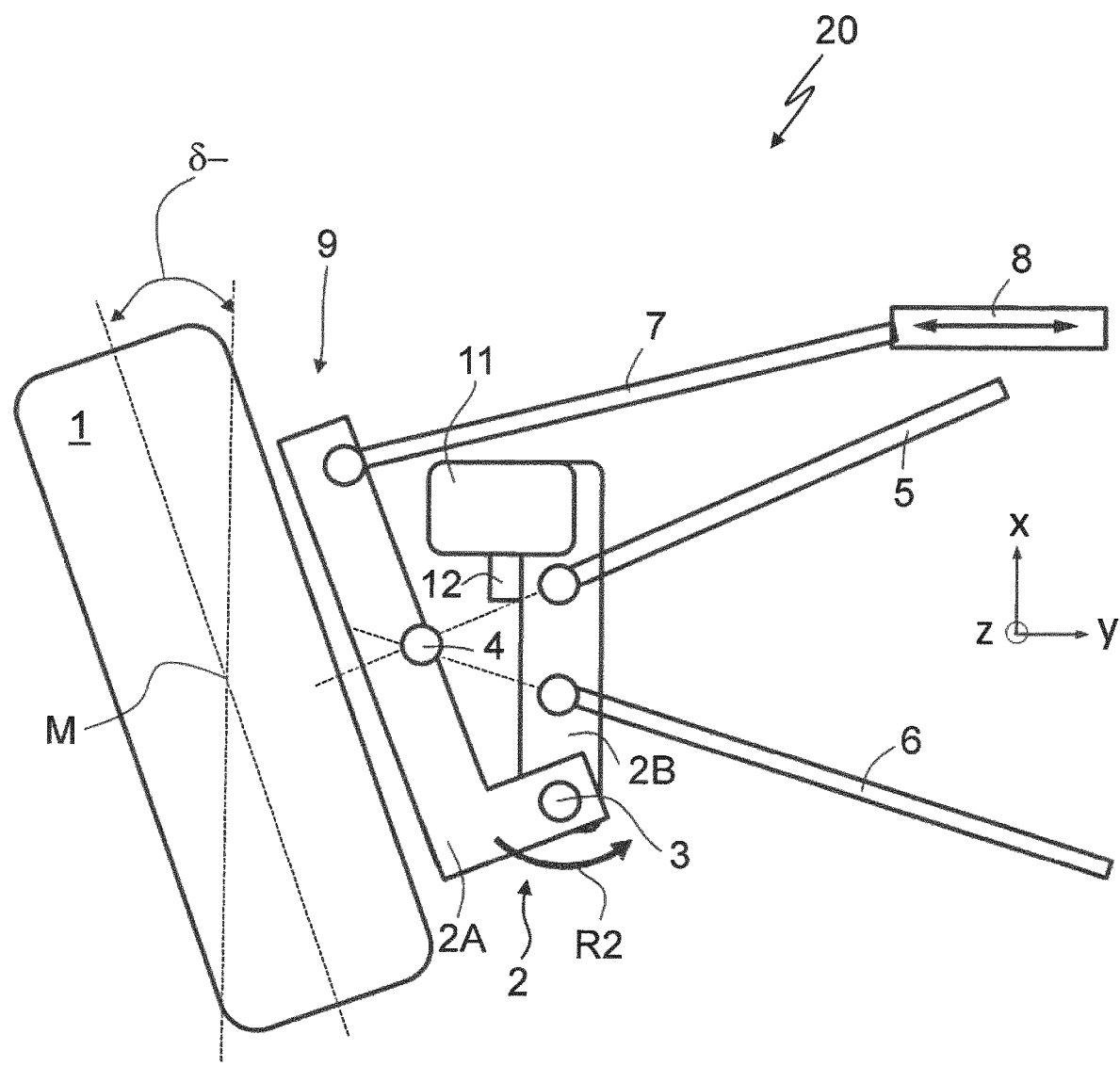
FIG. 3 shows, likewise in plan view, a second exemplary embodiment of a wheel suspension according to the invention designed according to the first aspect of the invention for a left-hand rear wheel of an axle of a vehicle with the wheel actively steered in a toe-out direction.

FIG. 3 shows, likewise in plan view, a second exemplary embodiment of a wheel suspension 20 according to the invention designed according to the first aspect of the invention, which wheel suspension is likewise provided for a left-hand rear wheel of an axle of a vehicle, wherein the wheel suspension 20 is illustrated in FIG. 3 with the rear wheel 1 actively steered in the toe-out direction δ−.

This exemplary embodiment of a wheel suspension 20 according to the invention differs from the wheel suspension 10 according to the invention described above on the basis of FIGS. 1 to 2B in that, in the case of this wheel suspension 20, the pivot axis 3, which defines the first active steering axis 3, is arranged behind wheel center M in vehicle longitudinal direction x, and the toe link 7 and the actuator device with the actuator 8 are each arranged in front of wheel center M in vehicle longitudinal direction x. Correspondingly, the guide device 11 and the stop 12 are also arranged in front of wheel center M in vehicle longitudinal direction x.

This embodiment of a wheel suspension 20 according to the invention functions in accordance with the same principle as the wheel suspension 10 according to the invention described above on the basis of FIGS. 1 to 2B, only with the difference that the stop 12 limits the active steering in the direction of toe-in δ+ and not in the direction of toe-out, and that the first wheel carrier part 2A and the second wheel carrier part 2B are movable jointly about the second steering axis 4 only in the event of an overshooting of a defined active steering angle range in the toe-in direction δ+, that is to say for toe angles δ above said range, during further steering in the toe-in direction δ+. That is to say, during further steering in the toe-in direction δ+ after the stop 12 has been reached, the wheel suspension 20 thus behaves in the manner of a similar conventional wheel suspension with single-part wheel carrier.

Figure 4A:
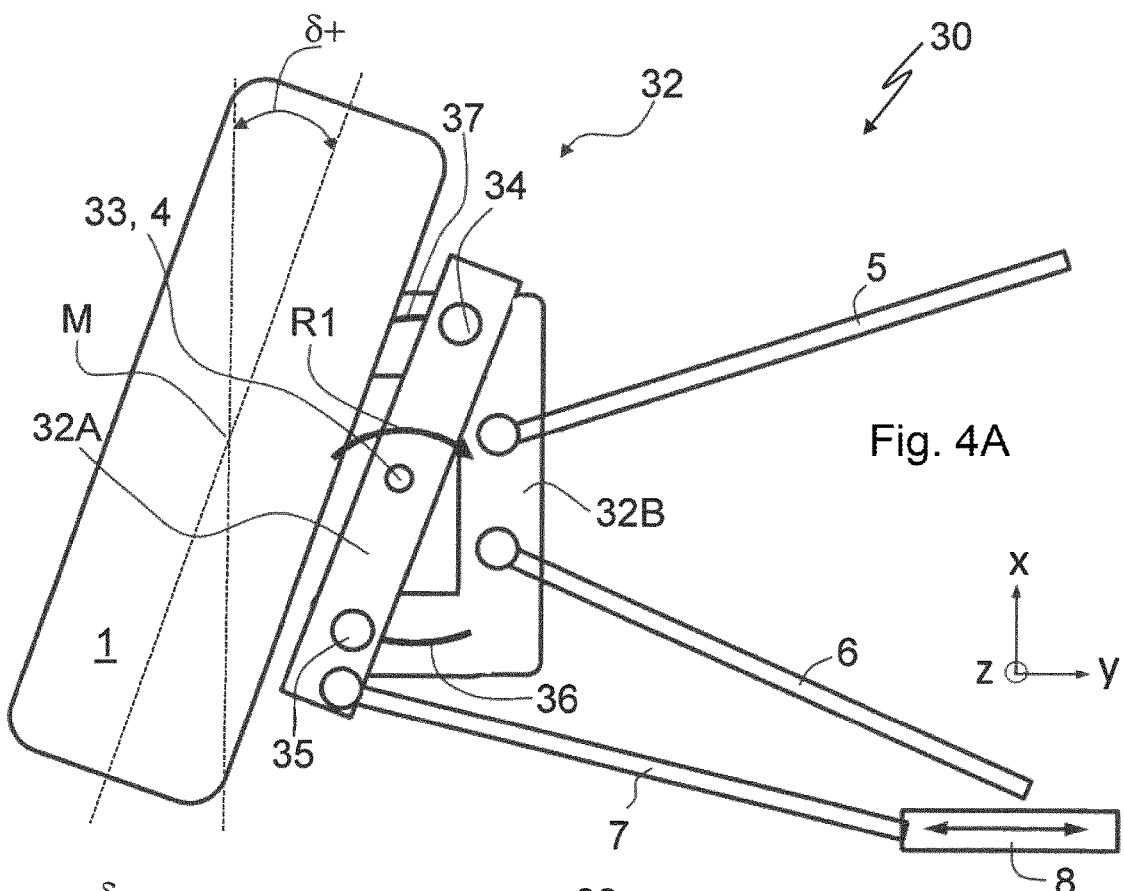
FIG. 4A shows, likewise in plan view, a third exemplary embodiment of a wheel suspension according to the invention designed according to the first aspect of the invention for a left-hand rear wheel of an axle of a vehicle with the wheel actively steered in a toe-in direction.
Figure 4B:
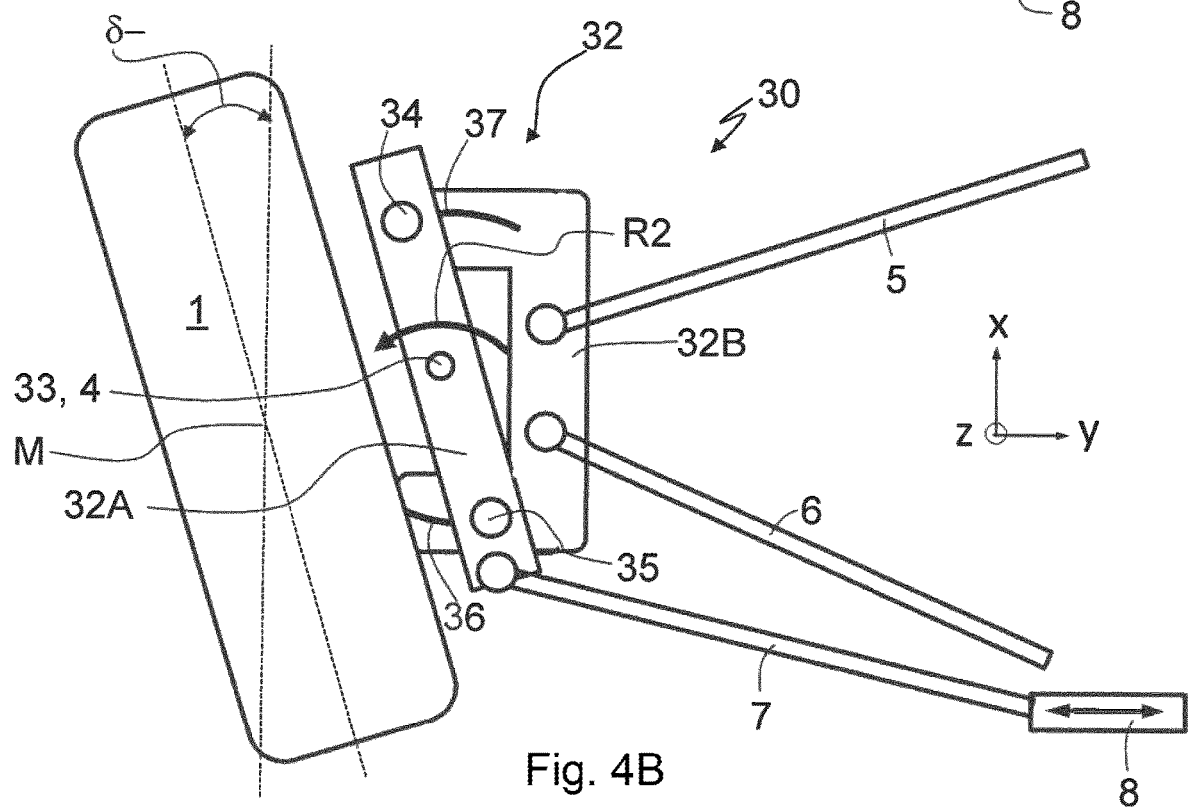
FIG. 4B shows, in plan view, the exemplary embodiment from FIG. 4A with the wheel actively steered in a toe-out direction.

FIGS. 4A and 4B show a third exemplary embodiment of a wheel suspension 30 according to the invention for a left-hand rear wheel 1 of an axle of a vehicle, wherein this wheel suspension 30 is likewise designed according to the first aspect of the invention and, accordingly, the toe link 7 is likewise articulated according to the invention on the first wheel carrier part 32A, wherein FIG. 4A shows the wheel suspension 30 according to the invention in plan view with the wheel actively steered in the toe-in direction δ+, and FIG. 4B shows the invention according to wheel suspension 30 with the wheel 1 actively steered in the toe-out direction δ−.

As in the exemplary embodiment of a wheel suspension 10 according to the invention described on the basis of FIGS. 1 to 2B, it is also the case in the wheel suspension 30 according to the invention illustrated in FIGS. 4A and 4B that the toe link 7 is, at the wheel carrier side, arranged in each case on the first wheel carrier part 32A behind wheel center M in vehicle longitudinal direction x.

The actuator device with the actuator 8, which is in this case likewise an electrically drivable linear motor 8, is likewise provided for connection behind wheel center M in vehicle longitudinal direction x, in particular likewise provided for connection to the rear-axle support.

In the case of this wheel suspension 30, the first wheel carrier part 32A however has a substantially rectangular cross section rather than an L-shaped cross section in z direction as in the case of the wheel suspensions 10 and 20 described above, and the second wheel carrier part 32B has a substantially U-shaped cross section rather than a substantially rectangular cross section in z direction.

Furthermore, this wheel suspension 30 differs from the two wheel suspensions 10 and 20 according to the invention described above in that the first wheel carrier part 32A and the second wheel carrier part 32B are connected to one another not pivotably about a pivot axis 3 by means of a bolt but rather in each case by means of two coupling devices 34 and 37, and 35 and 36, respectively, in the form of slotted links, which are formed in each case by a slotted-linked guide bolt 34 and 35 respectively and by correspondingly designed slotted-link guide grooves 36 and 37 respectively.

Here, the slotted-link guide grooves 36 and 37 are designed in each case for guiding the associated slotted-link guide bolt 34 and 35 respectively, and guide the associated slotted-link guide bolt 34 or 35 in particular during a displacement or movement thereof in vehicle transverse direction y, and thus during a displacement or movement of the first wheel carrier part 32A, wherein the slotted-link guide grooves 36 and 37 in this case have a slightly curved profile, preferably a circular-arc-shaped profile, wherein a curvature central point is situated in particular in each case between the two slotted-link guide grooves 37 and 36 in vehicle longitudinal direction x, preferably at the level of wheel center M. It is particularly preferable here for the two curvature central points of the two slotted-link guide grooves 37 and 36 to coincide and to define, in particular, the active steering axis 33.

A further difference of this wheel suspension 30 in relation to the exemplary embodiments described above is that, in the case of this wheel suspension 30, the axle geometry, axle kinematics and elastokinematics are selected such that the active steering axis 33 is the steering axis 33 about which, in each case, the entire wheel carrier 32 moves during further active and/or passive steering even in each case after the stops in the slotted links have been reached, in particular even after the end of at least one slotted-link guide groove 37 and/or 36 has been reached. That is to say, in this exemplary embodiment, the first active steering axis 33 also defines the second steering axis 4. It is self-evident that, in the case of other geometrical dimensions of the two wheel carrier parts 32A and 32B and in the case of a different design of the two coupling devices, in particular of the two slotted links, the steering axis 33 may be situated further forward or further rearward in vehicle longitudinal direction X and may also differ from the second steering axis 4, wherein, in the case of the wheel suspension 30 according to the invention illustrated in FIGS. 4A and 4B, the active steering axis 33 and the second steering axis 4 lie approximately at the level of wheel center M.

Figure 5A:
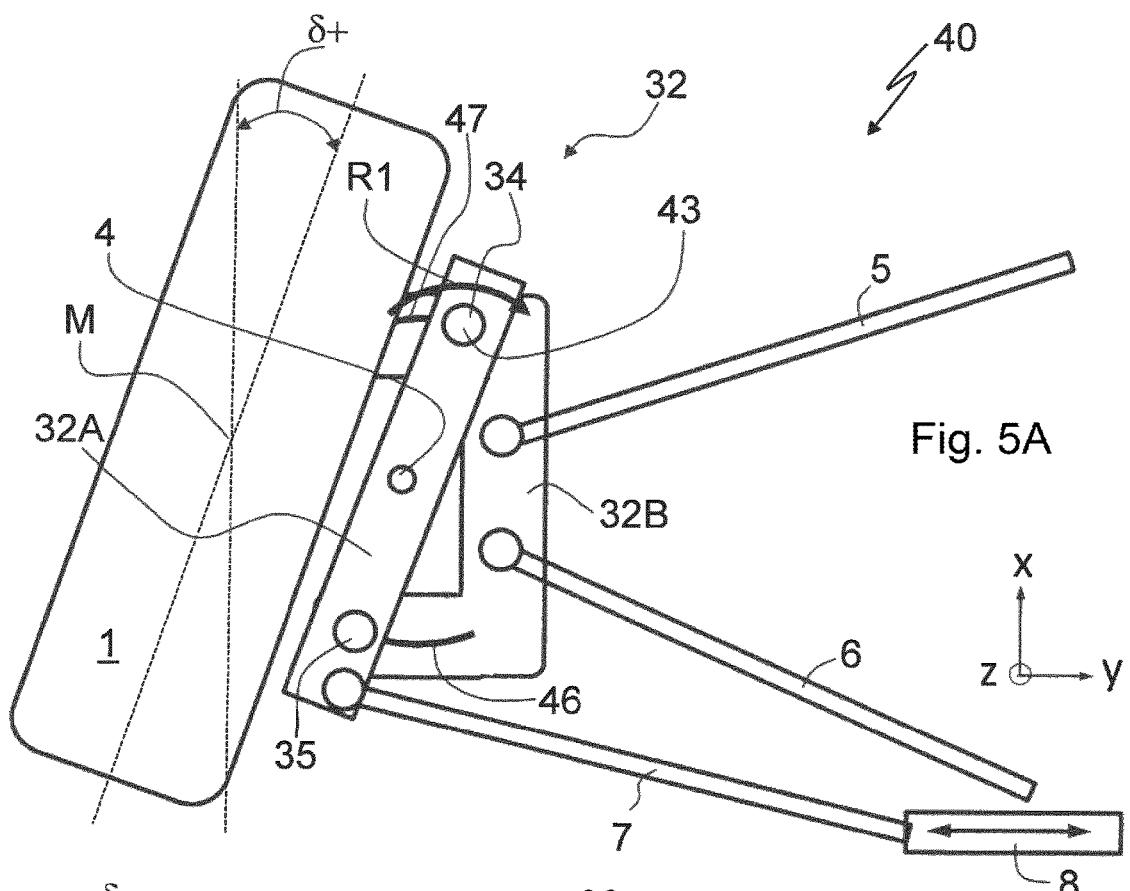
FIG. 5A shows, likewise in plan view, a fourth exemplary embodiment, designed similarly to the third exemplary embodiment, of a wheel suspension according to the invention designed according to the first aspect of the invention for a left-hand rear wheel of an axle of a vehicle with the wheel actively steered in a toe-in direction.
Figure 5B:
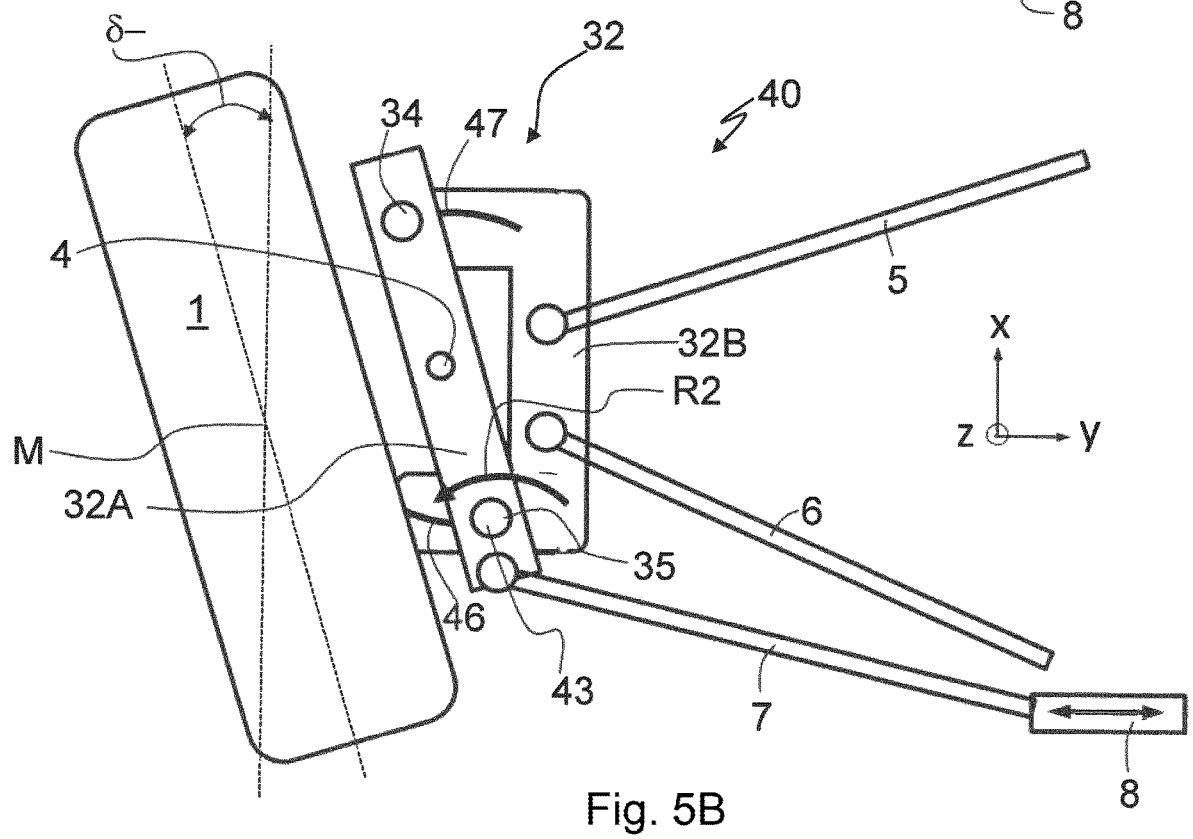
FIG. 5B shows, in plan view, the exemplary embodiment from FIG. 5A with the wheel actively steered in a toe-out direction.

FIG. 5A shows a fourth exemplary embodiment, of similar design to the third exemplary embodiment, of a wheel suspension 40 according to the invention designed according to the first aspect of the invention for a left-hand rear wheel 1 of an axle of a vehicle with the wheel 1 actively steered in the toe-in direction δ+, and FIG. 5B shows, in plan view, the exemplary embodiment from FIG. 5A with the wheel 1 actively steered in the toe-out direction.

Here, the wheel suspension 40 from FIGS. 5A and 5B differs from the wheel suspension 30 described on the basis of FIGS. 4A and 4B in that, in the case of the wheel suspension 40 shown in FIGS. 5A and 5B, the slotted-link guide grooves 46 and 47 are each designed such that, during steering in the toe-in direction δ+, the first active steering axis 43, that is to say the steering axis that is effective during active steering in the toe-in direction δ+, lies in front of wheel center M, in particular in the region of the slotted-link guide bolt 34 and coincides with the longitudinal axis thereof, and that, during active steering in the toe-out direction δ−, the first active steering axis 43, that is to say the steering axis that is effective during active steering in the toe-out direction δ−, lies behind wheel center M, in particular in the region of the slotted-link guide bolt 35 and coincides with the longitudinal axis thereof, whereas, in the case of the wheel suspension 30, the first active steering axis 33 lies at the level of the wheel center.

By means of the arrangement of the first active steering axis 43 in each case considerably in front of wheel center M during active steering in the toe-in direction δ+ and/or considerably behind wheel center M during steering in the toe-out direction δ−, greater structural space advantages can be achieved than with the wheel suspension 30 according to the invention described on the basis of FIGS. 4A and 4B, in particular in the region of a wheel front edge situated toward the inside of the vehicle.

The different position of the first active steering axis 43 of the wheel suspension 40 in relation to the wheel suspension 30 may be achieved here by means of a different, correspondingly suitable embodiment of the slotted-link guide grooves 46 and 47. One possibility of a correspondingly suitable embodiment consists in designing the slotted-link guide grooves 46 and 47 in each case such that, proceeding from the straight-ahead position, a movement of the associated slotted-link guide bolt 34 or 35 in the respective guide groove 47 or 46 is possible in each case only in the direction of the outside of the vehicle. That is to say, preferably, the slotted-link guide grooves 47 and 46 are designed such that the associated slotted-link guide bolts 34 and 35 are, in the straight-ahead position, situated in each case at the vehicle-inside end of the slotted-link guide grooves 47 and 46 respectively, that is to say in each case at a vehicle-inside end stop of the associated slotted-link guide grooves 47 and 46 respectively.

After the maximum possible toe-in and/or toe-out angle δ+ or δ− settable by active steering has been reached, the wheel 1 of a wheel suspension 40 according to the invention is preferably steerable or pivotable elastokinematically about the second steering axis 4 similarly to the case of a conventional axle, wherein, in this case, too, the two wheel carrier parts 32A and 32B move jointly about the second steering axis 4 during passive steering.

Figure 6:
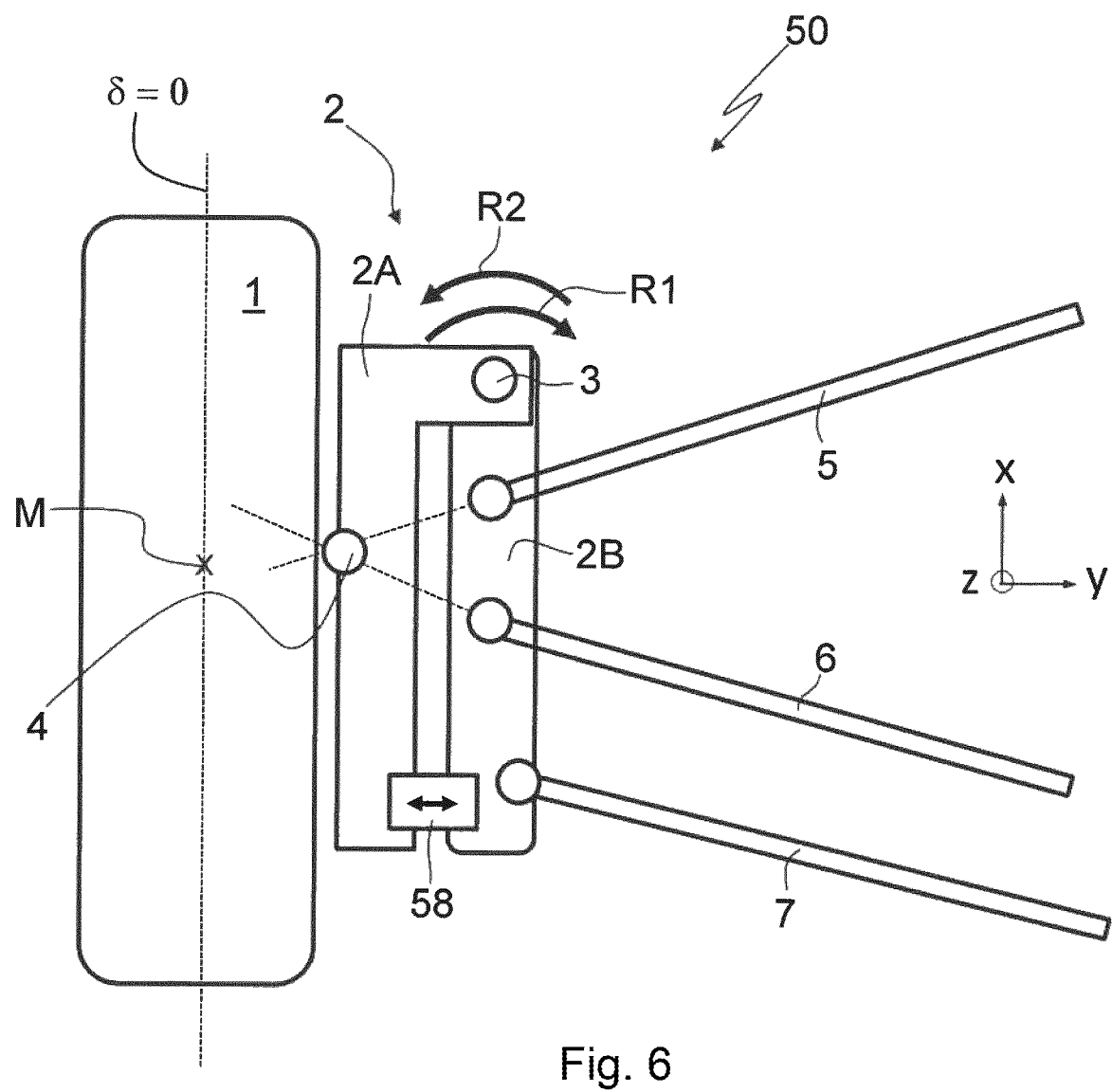
FIG. 6 shows a fifth exemplary embodiment of a wheel suspension according to the invention designed, however, according to the second aspect of the invention for a left-hand rear wheel of an axle of a vehicle in a straight-ahead position in plan view.

FIG. 6 shows a fifth exemplary embodiment of a wheel suspension 50 according to the invention for a left-hand rear wheel of an axle of a vehicle in a straight-ahead position, with δ=0°, in plan view, wherein the wheel suspension 50 is designed according to the second aspect of the invention.

According to the invention, the toe link 7 is connected at the wheel carrier side to the second wheel carrier part 2B, and the first wheel carrier part 2A and the second wheel carrier part 2B are coupled to one another by means of an actuator 58, in particular are directly connected to one another by means of the actuator 58, wherein the actuator 58 is likewise an electrically driven linear motor.

The wheel suspension 50 from FIG. 6 otherwise corresponds to the wheel suspension 10 from FIGS. 1 to 2B. In particular, the first wheel carrier part 2A and the second wheel carrier part 2B are likewise designed as in the first exemplary embodiment of a wheel suspension 10 according to the invention, and are likewise connected to one another pivotably about a pivot axis 3, which defines a first active steering axis 3, by means of a bolt.

Figure 7A:
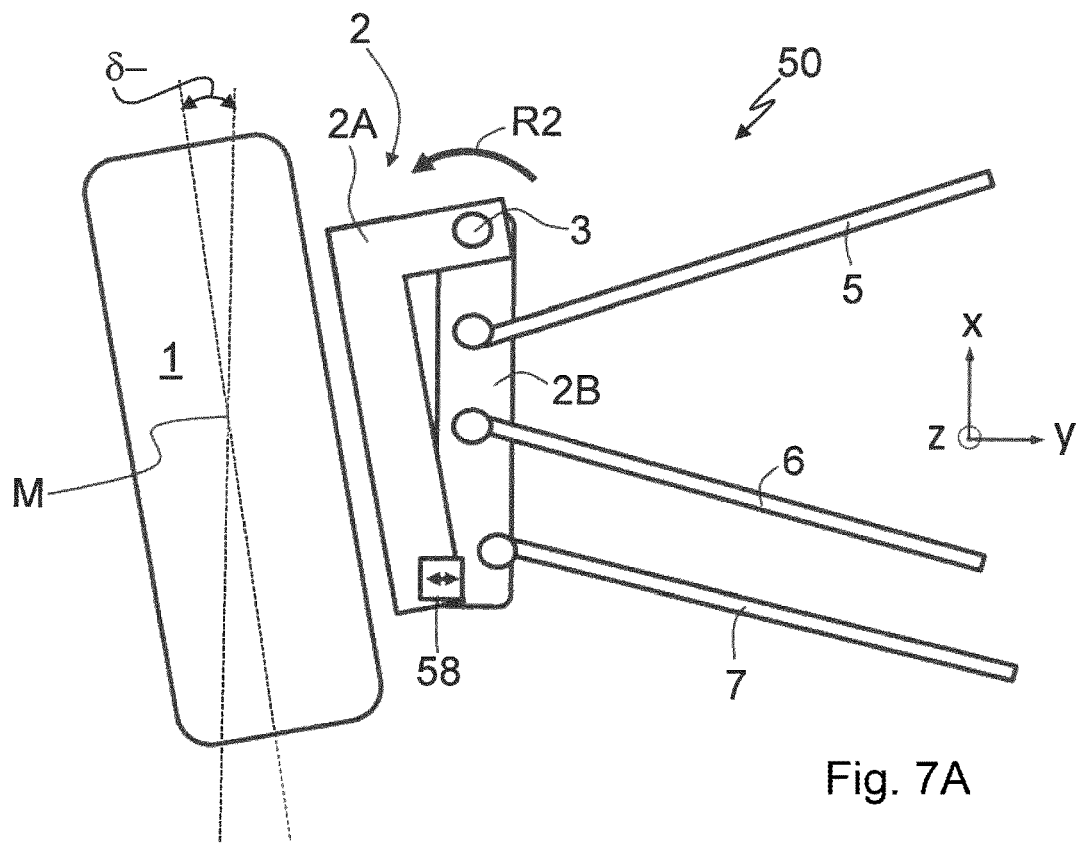
FIG. 7A shows, in plan view, the exemplary embodiment from FIG. 6 with the wheel actively steered in a toe-out direction.
Figure 7B:
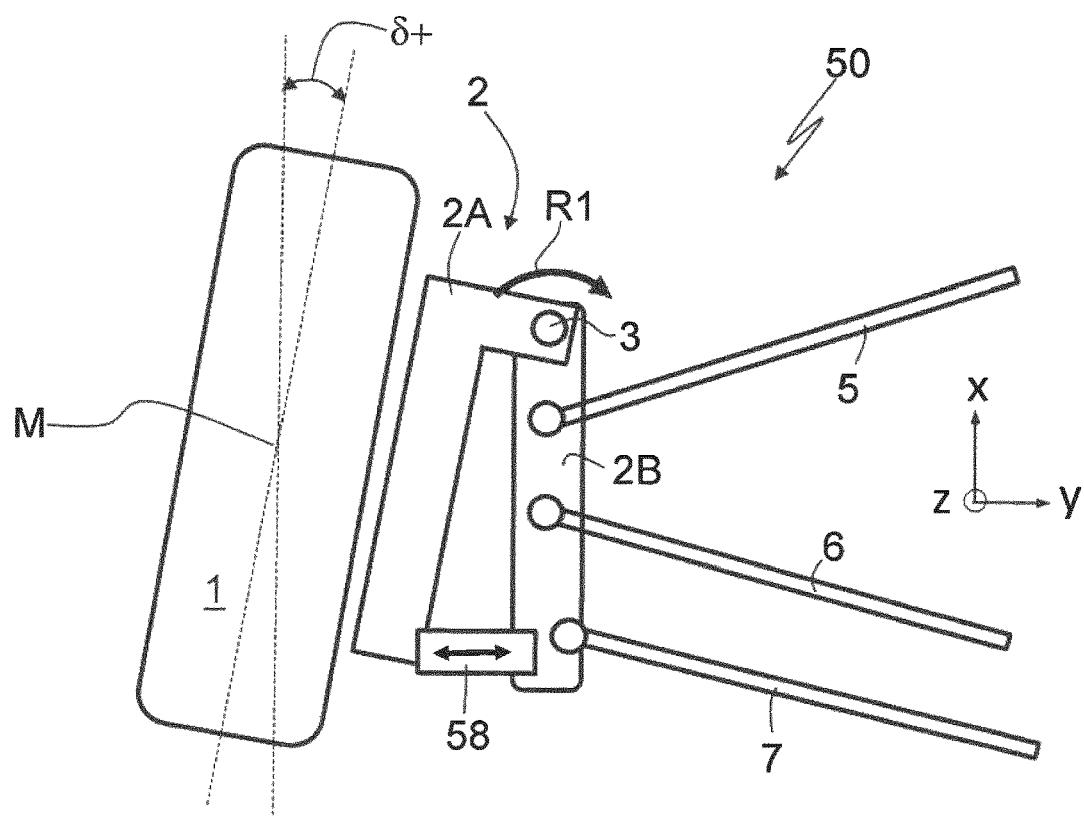
FIG. 7B shows, in plan view, the exemplary embodiment from FIGS. 6 and 7A with the wheel actively steered in a toe-in direction.

It can be clearly seen from FIGS. 7A and 7B how, in the case of the wheel suspension 50 according to the invention from FIG. 6, active steering can be effected in each case by means of the actuator 58, wherein, here, the pivot axis 3 forms the first active steering axis 3 in each case both during active steering in the toe-in direction δ+ and during active steering in the toe-out direction δ− proceeding from the straight-ahead position δ=0.

After a stop that is not illustrated in either of FIGS. 7A and 7B (see FIGS. 1 to 2B), in particular an in each case mechanical stop of the actuator 58, has been reached, it is the case during passive steering that both wheel carrier parts 2A and 2B are pivotable, as in the case of the first exemplary embodiment of a wheel suspension 10 according to the invention, jointly, in particular without a relative movement with respect to one another, likewise about a second steering axis (not shown), which in particular does not coincide with the first active steering axis 3 but rather is situated approximately at the level of wheel center M, as in the case of the first exemplary embodiment of a wheel suspension 10 according to the invention.

Figure 8A:
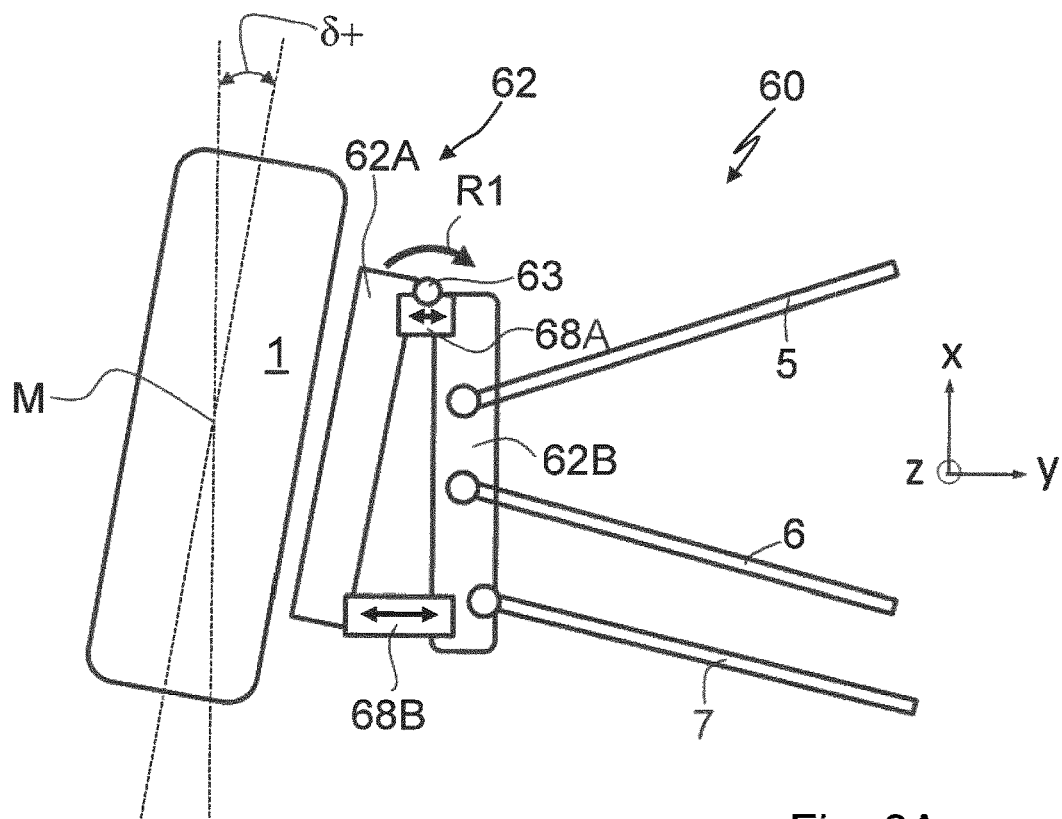
FIG. 8A shows, likewise in plan view, a sixth exemplary embodiment of a wheel suspension according to the invention likewise designed according to the second aspect of the invention for a left-hand rear wheel of an axle of a vehicle with the wheel actively steered in a toe-in direction.
Figure 8B:
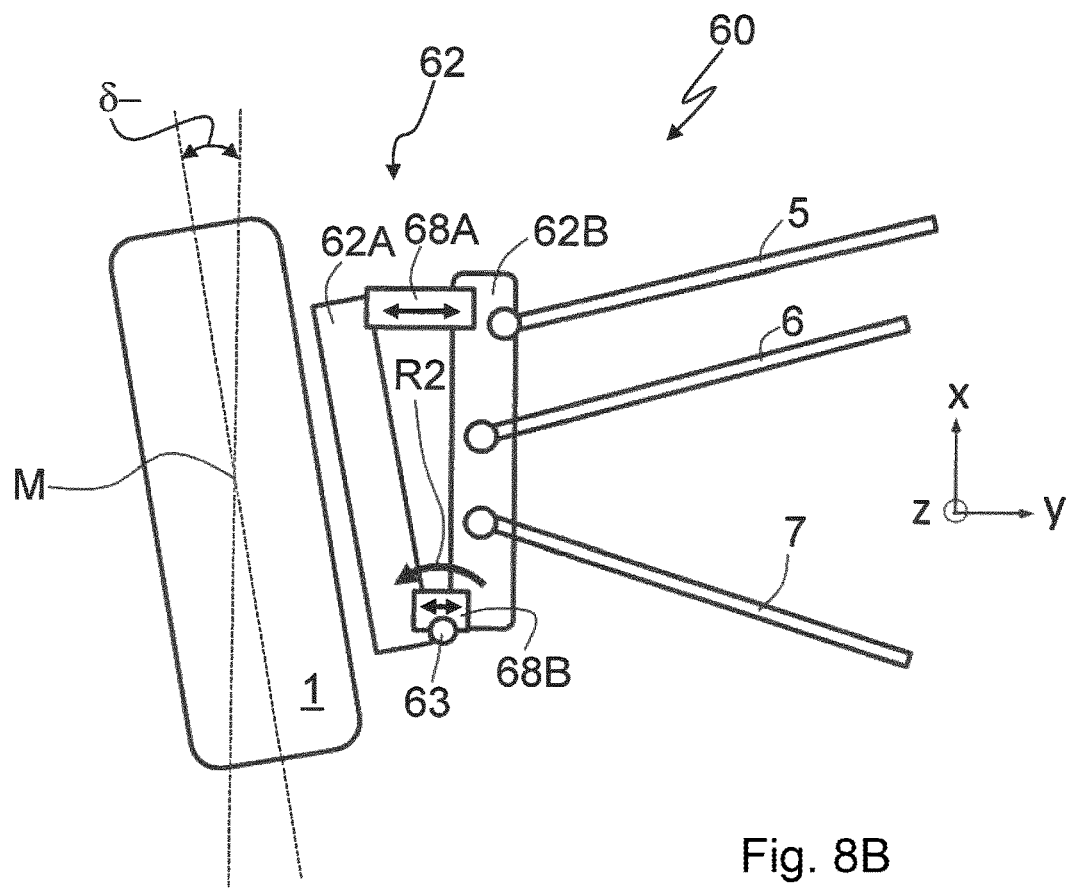
FIG. 8B shows, in plan view, the exemplary embodiment from FIG. 8A with the wheel actively steered in a toe-out direction.

FIGS. 8A and 8B show, likewise in plan view, a sixth exemplary embodiment of a wheel suspension 60 according to the invention, which is likewise designed according to the second aspect of the invention, for a left-hand rear wheel of an axle of a vehicle, wherein the wheel suspension 60 according to the invention is illustrated in FIG. 8A with the wheel 1 actively steered in the toe-in direction δ+, and is illustrated in FIG. 8B with the wheel 1 actively steered in the toe-out direction δ−.

As in the case of the fourth exemplary embodiment of a wheel suspension 50 according to the invention described on the basis of FIGS. 7A and 7B, it is also the case in this exemplary embodiment that the toe link 7 is, according to the invention, articulated at the wheel carrier side on the second wheel carrier part 62B and is provided for being connected directly to the vehicle body and to the rear-axle support.

In this exemplary embodiment of a wheel suspension 60 according to the invention, the two wheel carrier parts 62A and 62B each have a substantially rectangular cross section in vehicle vertical direction z, wherein the two wheel carrier parts 62A and 62B are coupled to one another directly by means of two actuators 68A and 68B and are in particular directly connected to one another.

Here, in the case of this wheel suspension 60, the two actuators 68A and 68B are designed such that they each also perform a function as a guide device, and furthermore a function as a coupling device, that is to say they not only serve for generating the active steering movement but also perform the function of the guide device 11 that has been described on the basis of the wheel suspension 10, and the guidance of the first wheel carrier part 62A during displacement relative to the second wheel carrier part 62B.

In some usage situations, in particular in the presence of relatively high acting wheel forces, it may however be more advantageous to separate the guidance function and/or the coupling function from the actuator function and, for the purposes of supporting the acting wheel forces, to additionally provide at least one guide device and/or one coupling device, in particular one at least one slotted link, in each case in addition to at least one actuator. In this way, the actuator device, in particular at least one actuator, can be relieved of the load of the acting wheel forces.

As can be clearly seen from FIGS. 8A and 8B, this exemplary embodiment of a wheel suspension 60 according to the invention is in this case designed such that, during active steering in the toe-in direction δ+, the first wheel carrier part 62A is pivotable about an active steering axis 63 which is situated in front of wheel center in vehicle longitudinal direction x, whereas, during active steering in the toe-out direction δ−, in particular in each case proceeding from the straight-ahead position, that is to say in each case proceeding from δ=0, the active steering axis 63 is situated behind wheel center in vehicle longitudinal direction x, wherein, in this exemplary embodiment of a wheel suspension 60 according to the invention, the first active steering axis 63 is basically variable in vehicle longitudinal direction x, in each case in a manner dependent on the states of the two actuators 68A and 68B, in particular in a manner dependent on the actuator state of the first actuator 68A in relation to the actuator state of the second actuator 68B.

In order, however, to make the configuration of the kinematics and elastokinematics of the wheel suspension 60 as simple as possible, it is particularly advantageous if, proceeding from the straight-ahead position, that is to say δ=0°, an active steering movement for steering in the toe-in direction δ+ is effected only by means of the actuator 68B, which in this case is arranged behind wheel center M, and, for active steering in the toe-out direction δ−, the steering movement is effected only by means of the actuator 68A, which in this case is arranged in front of wheel center M, such that, during active steering in the toe-in direction δ+ proceeding from the straight-ahead position δ=0°, the first active steering axis 63, as illustrated in FIG. 8A, lies considerably in front of wheel center M, and in particular is situated at the level of the front actuator 68A, and, during steering in the toe-out direction δ− proceeding from the straight-ahead position δ=0°, the first active steering axis 63 lies behind wheel center M, as indicated in FIG. 8B, in particular approximately at the level of the second actuator 68B.

As in the case of the above exemplary embodiment of a wheel suspension 50 according to the invention described on the basis of FIGS. 7A and 7B, the wheel suspension 60 according to the invention illustrated in FIGS. 8A and 8B also has in each case one second steering axis (likewise not shown here) about which a pivoting movement of both wheel carrier parts 62A and 62B takes place jointly in each case during passive steering.

A multiplicity of modifications, in particular structural modifications, in relation to the exemplary embodiments discussed is self-evidently possible without departing from the content of the patent claims.

LIST OF REFERENCE DESIGNATIONS

10, 20, 30, Wheel suspension according to the invention
40, 50, 60
1 Wheel
2, 32, 62 Wheel carrier
2A, 32A, 62A First wheel carrier part
2B, 32B, 62B Second wheel carrier part
3, 33, 43, 63 Pivot axis, first active steering axis
4 Second active steering axis
5 Further link
6 Further link
7 Toe link
8, 58, 68A, 68B Actuator
9 Free end of the first wheel carrier part
11 Guide device
12 Stop element
34 Slotted-link guide bolt
35 Slotted-link guide bolt
36, 46 Slotted-link guide groove
37, 47 Slotted-link guide groove
M Wheel center
R1 First active steering direction
R2 Second active steering direction
x Vehicle longitudinal direction
y Vehicle transverse direction
z Vehicle vertical direction
δ Toe angle
δ=0 Toe angle, straight-ahead position
δ+ Toe angle, toe-in
δ− Toe angle, toe-out The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A wheel suspension for an at least slightly actively steerable rear wheel of a two-track vehicle, comprising:
a wheel carrier for holding the wheel;
a toe link;
at least one further link for connecting the wheel carrier to a vehicle body; and
an actuator device with at least one actuator for actively steering the wheel in a first active steering direction and in a second active steering direction, wherein
the wheel carrier is formed in at least two parts and has a first wheel carrier part and a second wheel carrier part,
the first wheel carrier part is configured for holding the wheel and the second wheel carrier part is connectable by way of at least one of the further links to the vehicle body,
in a functional state of use of the wheel suspension in a vehicle, the first wheel carrier part and the second wheel carrier part are movable relative to one another by way of the actuator device such that an active, at least slight steering movement of the wheel is effected,
the toe link is articulated at a wheel carrier side on the first wheel carrier part and the actuator of the actuator device is coupled by way of the toe link to the first wheel carrier part,
the first wheel carrier part and the second wheel carrier part are mechanically connected to one another by two coupling devices which are configured to guide the first wheel carrier part and the second wheel carrier part in each case oppositely in a vehicle transverse direction during active steering,
a relative movement of the two wheel carrier parts with respect to one another effects a steering movement of the wheel about an active steering axis,
the active steering axis lies between the two coupling devices in a vehicle longitudinal direction, and
each coupling device of the two coupling devices comprises a slotted-link guide bolt and a corresponding slotted-link guide groove having a curved profile, with a center of curvature in the vehicle longitudinal direction between the slotted-link guide grooves.

2. The wheel suspension according to claim 1, wherein the first wheel carrier part and the second wheel carrier part are connected to one another pivotably about a pivot axis running substantially in a vehicle vertical direction, which pivot axis defines an active steering axis at least in a first defined active steering angle range and/or for the first active steering direction.

3. The wheel suspension according to claim 2, wherein the pivot axis is situated in front of a wheel center in a vehicle longitudinal direction.

4. The wheel suspension according to claim 3, wherein the toe link is articulated on the wheel carrier behind the wheel center in the vehicle longitudinal direction.

5. The wheel suspension according to claim 2, wherein at least one wheel carrier part has a guide device for at least partially guiding the other wheel carrier part.

6. The wheel suspension according to claim 5, wherein the guide device guides a free end of the other wheel carrier part, which free end is averted from the pivot axis.

7. The wheel suspension according to claim 1, wherein the wheel carrier has at least one stop in order to limit an active steering movement about the active steering axis in at least one active steering direction.

8. The wheel suspension according to claim 7, wherein the wheel suspension is configured such that, after the stop has been reached, the first wheel carrier part and the second wheel carrier part are movable jointly about a second steering axis during further steering, wherein the second steering axis is defined by a geometry and elastokinematics of the wheel suspension.

9. An axle for a two-track vehicle, comprising:
a left-hand wheel suspension and a right-hand wheel suspension, wherein
at least one of the left-hand and right-hand wheel suspensions is a wheel suspension according to claim 1.

10. The axle according to claim 9, wherein
the axle has the left-hand wheel suspension for a left-hand wheel and the right-hand wheel suspension for a right-hand wheel,
the left-hand wheel suspension and the right-hand wheel suspension have a common actuator, wherein, in a functional installed state of the axle in a vehicle, the first wheel carrier part and the second wheel carrier part of the left-hand wheel suspension are movable relative to one another by the common actuator such that an active, at least slight steering movement of the left-hand wheel can be effected, and wherein, at the same time, in a functional installed state of the axle in a vehicle, the first wheel carrier part and the second wheel carrier part of the right-hand wheel suspension are movable relative to one another by the common actuator such that an active, at least slight steering movement of the right-hand wheel in the same direction, can be effected.

11. A two-track motor vehicle, comprising at least one wheel suspension according to claim 1.

12. A wheel suspension for an at least slightly actively steerable rear wheel of a two-track vehicle, comprising:
a wheel carrier for holding the wheel;
a toe link;
at least one further link for connecting the wheel carrier to a vehicle body; and
an actuator device with at least one actuator for actively steering the wheel in a first active steering direction and in a second active steering direction, wherein
the wheel carrier is formed in at least two parts and has a first wheel carrier part and a second wheel carrier part,
the first wheel carrier part is configured for holding the wheel and the second wheel carrier part is connectable by way of at least one of the further links to the vehicle body,
in a functional state of use of the wheel suspension in a vehicle, the first wheel carrier part and the second wheel carrier part are movable relative to one another by way of the actuator device such that an active, at least slight steering movement of the wheel is effected,
the toe link is articulated at a wheel carrier side on the second wheel carrier part and the actuator of the actuator device couples the first wheel carrier part to the second wheel carrier part,
the first wheel carrier part and the second wheel carrier part are mechanically connected to one another by two coupling devices which are configured to guide the first wheel carrier part and the second wheel carrier part in each case oppositely in a vehicle transverse direction during active steering, a relative movement of the two wheel carrier parts with respect to one another effects a steering movement of the wheel about an active steering axis, the active steering axis lies between the two coupling devices in a vehicle longitudinal direction, and each coupling device of the two coupling devices comprises a slotted-link guide bolt and a corresponding slotted-link guide groove having a curved profile, with a center of curvature in the vehicle longitudinal direction between the slotted-link guide grooves.

13. The wheel suspension according to claim 12, wherein the actuator of the actuator device is connected to the first wheel carrier part and the second wheel carrier part and is at least partially arranged between the first wheel carrier part and the second wheel carrier part in a vehicle transverse direction.

14. The wheel suspension according to claim 12, wherein the actuator device has at least two actuators, and the first wheel carrier part and the second wheel carrier part are coupled to one another by the two actuators of the actuator device.

15. The wheel suspension according to claim 14, wherein the first wheel carrier part and the second wheel carrier part are, for active steering, movable in each case oppositely in a vehicle transverse direction by the two actuators, a relative movement of the two wheel carrier parts with respect to one another effects a steering movement of the wheel about an active steering axis, the active steering axis is situated in front of a wheel center in a vehicle longitudinal direction in the case of active steering in a first active steering direction and is situated behind the wheel center in the case of active steering in a second active steering direction.

16. The wheel suspension according to claim 15, wherein the active steering axis lies at a level of the wheel center.

* * * * *